US012812200B2

(12) United States Patent
Duddu et al.

(10) Patent No.: US 12,812,200 B2
(45) Date of Patent: Nov. 24, 2026

(54) TELEVISION REMOTE CONTROL INCLUDING SENIOR LIVING APPLICATIONS

(71) Applicant: DISH Network Technologies India Private Limited, Bangalore (IN)

(72) Inventors: Srinivasarao Duddu, Bangalore (IN); Ananda Siddappa, Bangalore (IN); Sendhil Kumar KB, Bangalore (IN)

(73) Assignee: DISH Network Technologies India Private Limited (IN)

( * ) Notice: Subject to any disclaimer, the term of this patent is extended or adjusted under 35 U.S.C. 154(b) by 138 days.

(21) Appl. No.: 18/679,055

(22) Filed: May 30, 2024

(65) Prior Publication Data

US 2025/0373877 A1 Dec. 4, 2025

(51) Int. Cl.
*H04N 21/422* (2011.01)

(52) U.S. Cl.
CPC ... *H04N 21/4221* (2013.01); *H04N 21/42221* (2013.01)

(58) Field of Classification Search
CPC ..................... H04N 21/4221; H04N 21/42221
See application file for complete search history.

(56) References Cited

U.S. PATENT DOCUMENTS

| | | | | |
|---|---|---|---|---|
| 7,028,912 | B1 * | 4/2006 | Rosen | G05D 23/1905 236/94 |
| 8,884,745 | B2 | 11/2014 | VanDuyN | |
| 9,654,719 | B2 | 5/2017 | Langille | |
| 2010/0212001 | A1 * | 8/2010 | Kashyap | H04N 21/42204 726/7 |
| 2014/0115628 | A1 * | 4/2014 | Park | H04N 21/42222 725/37 |
| 2014/0139750 | A1 * | 5/2014 | Waites | H04N 21/41265 348/734 |
| 2016/0358454 | A1 * | 12/2016 | Grove | G16H 10/60 |

* cited by examiner

*Primary Examiner* — Omeed Alizada
(74) *Attorney, Agent, or Firm* — Kipman T. Werking; Frontier IP Law PLLC

(57) ABSTRACT

A disclosed remote control may include a dedicated user profile button that is configured such that pressing the dedicated user profile button triggers a message from a transmitter of a television remote control indicating that a specific user preference profile, from among a plurality of stored user preference profiles, is activated and enables a receiving device that receives the message from the transmitter to adjust a display in accordance with preferences of the specific user preference profile.

20 Claims, 26 Drawing Sheets

TELEVISION REMOTE CONTROL INCLUDING SENIOR LIVING APPLICATIONS

BRIEF SUMMARY

This disclosure is generally directed to systems, methods, and computer-readable media relating to a television remote control including senior living applications. In the modern economy, as individuals grow into retirement age, these individuals can face particular problems and challenges that are associated with senior living. Senior citizens sometimes have difficulty fully understanding or interacting with new technologies, such as television receivers and remote controls. Additionally, senior citizens may sometimes encounter emergencies in which it would be beneficial to streamline the process of contacting emergency services as soon as possible. In view of the above, this disclosure reveals technology that may help to address one or more of the challenges or inefficiencies that are outlined above. Additionally, or alternatively, this disclosure also reveals various technologies that may provide numerous further benefits and/or address additional problems, as discussed in more detail below. For example, although various embodiments of the disclosure may focus upon the context of senior living, these various embodiments may also similarly provide benefits for children, the disabled, and/or any other individuals that would benefit from a simpler and/or more streamlined interface with a remote control and/or corresponding television.

In some examples of a first embodiment, a method includes (i) integrating a set of subcomponents into a television remote control for controlling a television, the set of subcomponents comprising: a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degree of volume to be increased or decreased, a microcontroller that executes instructions to implement the television remote control, and a dedicated user profile button that is configured such that pressing the dedicated user profile button triggers a message from the transmitter of the television remote control indicating that a specific user preference profile, from among a plurality of stored user preference profiles, is activated and enables the receiving device that receives the message from the transmitter to adjust a display in accordance with preferences of the specific user preference profile, and (ii) provisioning the television remote control.

In some examples of the first embodiment, the set of subcomponents integrated into the television remote control for controlling the television further comprises a dedicated emergency contact button that is configured such that pressing the dedicated emergency contact button triggers a message from the transmitter of the television remote control commanding a receiving device to call a phone number configured as an emergency contact.

In some examples of the first embodiment, integrating the subcomponents produces the television remote control such that: the television remote control includes a simpler button set that facilitates senior living, the television remote control includes a more complex button set that provides a user with more complicated and more comprehensive functionality than the simpler button set, and the television remote control includes a switch that switches between enabling the simpler button set and the more complex button set.

In some examples of the first embodiment, the switch comprises a slide that enables the user to slide the simpler button set over the more complex button set.

In some examples of the first embodiment, the switch comprises a dedicated switch button that switches between the simpler button set and the more complex button set.

In some examples of the first embodiment, the simpler button set includes at least one instance of the power button that toggles between on and off and the more complex button set includes an additional instance of the power button that toggles between on and off.

In some examples of the first embodiment, the simpler button set includes the dedicated user profile button that is configured such that pressing the dedicated user profile button triggers the message from the transmitter of the television remote control indicating that the specific user preference profile, from among the plurality of stored user preference profiles, is activated and enables the receiving device that receives the message from the transmitter to adjust a display in accordance with preferences of the specific user preference profile.

In some examples of the first embodiment, the simpler button set is included on one face of the television remote control and the more complex button set is included on an opposite face of the television remote control that is opposite of the one face.

In some examples of the first embodiment, the switch is configured such that the switch disables the simpler button set when enabling the more complex button set or the switch disables the more complex button set when enabling the simpler button set.

In some examples of the first embodiment, a television remote control comprises a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degree of volume to be increased or decreased, a microcontroller that executes instructions to implement the television remote control, and a dedicated user profile button that is configured such that pressing the dedicated user profile button triggers a message from the transmitter of the television remote control indicating that a specific user preference profile, from among a plurality of stored user preference profiles, is activated and enables the receiving device that receives the message from the transmitter to adjust a display in accordance with preferences of the specific user preference profile.

In some examples of a second embodiment, a method comprises (i) integrating a set of subcomponents into a television remote control for controlling a television, the set of subcomponents comprising: a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degree of volume to be increased or decreased, a microcontroller that executes instructions to implement the television remote control, and a dedicated emergency contact button that is configured such that pressing the dedicated emergency contact button triggers a message from the transmitter of the television remote control commanding a receiving device to call a phone number configured as an emergency contact, and (ii) provisioning the television remote control.

In some examples of the second embodiment, the set of subcomponents integrated into the television remote control for controlling a television further comprises a dedicated user profile button that is configured such that pressing the dedicated user profile button triggers a message from the transmitter of the television remote control indicating that a specific user preference profile, from among a plurality of stored user preference profiles, is activated and enables the receiving device that receives the message from the transmitter to adjust a display in accordance with preferences of the specific user preference profile.

In some examples of the second embodiment, integrating the subcomponents produces the television remote control such that: the television remote control includes a simpler button set that facilitates senior living, the television remote control includes a more complex button set that provides a user with more complicated and more comprehensive functionality than the simpler button set, and the television remote control includes a switch that switches between enabling the simpler button set and the more complex button set.

In some examples of the second embodiment, the switch comprises a slide that enables the user to slide the simpler button set over the more complex button set.

In some examples of the second embodiment, the switch comprises a dedicated switch button that switches between the simpler button set and the more complex button set.

In some examples of the second embodiment, the simpler button set includes at least one instance of the power button that toggles between on and off and the more complex button set includes an additional instance of the power button that toggles between on and off.

In some examples of the second embodiment, the simpler button set includes a dedicated user profile button that is configured such that pressing the dedicated user profile button triggers the message from the transmitter of the television remote control indicating that a specific user preference profile, from among a plurality of stored user preference profiles, is activated and enables the receiving device that receives the message from the transmitter to adjust a display in accordance with preferences of the specific user preference profile.

In some examples of the second embodiment, the simpler button set is included on one face of the television remote control and the more complex button set is included on an opposite face of the television remote control that is opposite of the one face.

In some examples of the second embodiment, the switch is configured such that the switch disables the simpler button set when enabling the more complex button set or the switch disables the more complex button set when enabling the simpler button set.

In some examples of the second embodiment, a television remote control comprises a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degree of volume to be increased or decreased, a microcontroller that executes instructions to implement the television remote control, and a dedicated emergency contact button that is configured such that pressing the dedicated emergency contact button triggers a message from the transmitter of the television remote control commanding a receiving device to call a phone number configured as an emergency contact.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
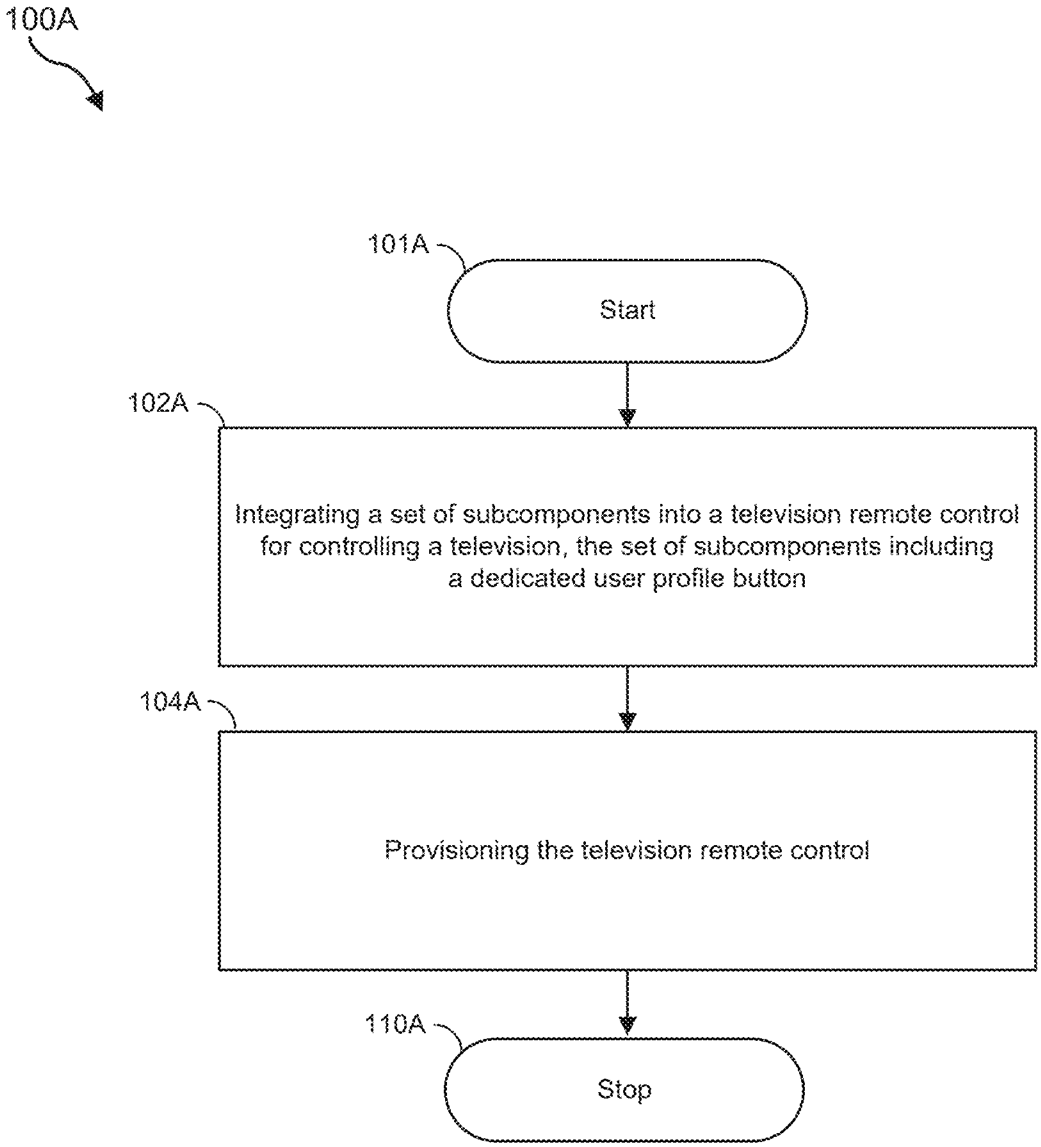
FIG. 1A shows a flow diagram for a method relating to a television remote control including senior living applications.

FIG. 1A shows a flow diagram for a method 100A relating to a television remote control including senior living applications. At step 101A method 100A may start or begin. At step 102A, method 100A may include integrating a set of subcomponents into a television remote control for controlling a television. The set of subcomponents may include a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degree of volume to be increased or decreased, a microcontroller that executes instructions to implement the television remote control, and/or a dedicated user profile button that is configured such that pressing the dedicated user profile button triggers a message from the transmitter of the television remote control indicating that a specific user preference profile, from among a plurality of stored user preference profiles, is activated and enables the receiving device that receives the message from the transmitter to adjust a display in accordance with preferences of the specific user preference profile. At step 104A, method 100A may include provisioning the television remote control. At step 110A, method 100A may stop or conclude.

Figure 1B:
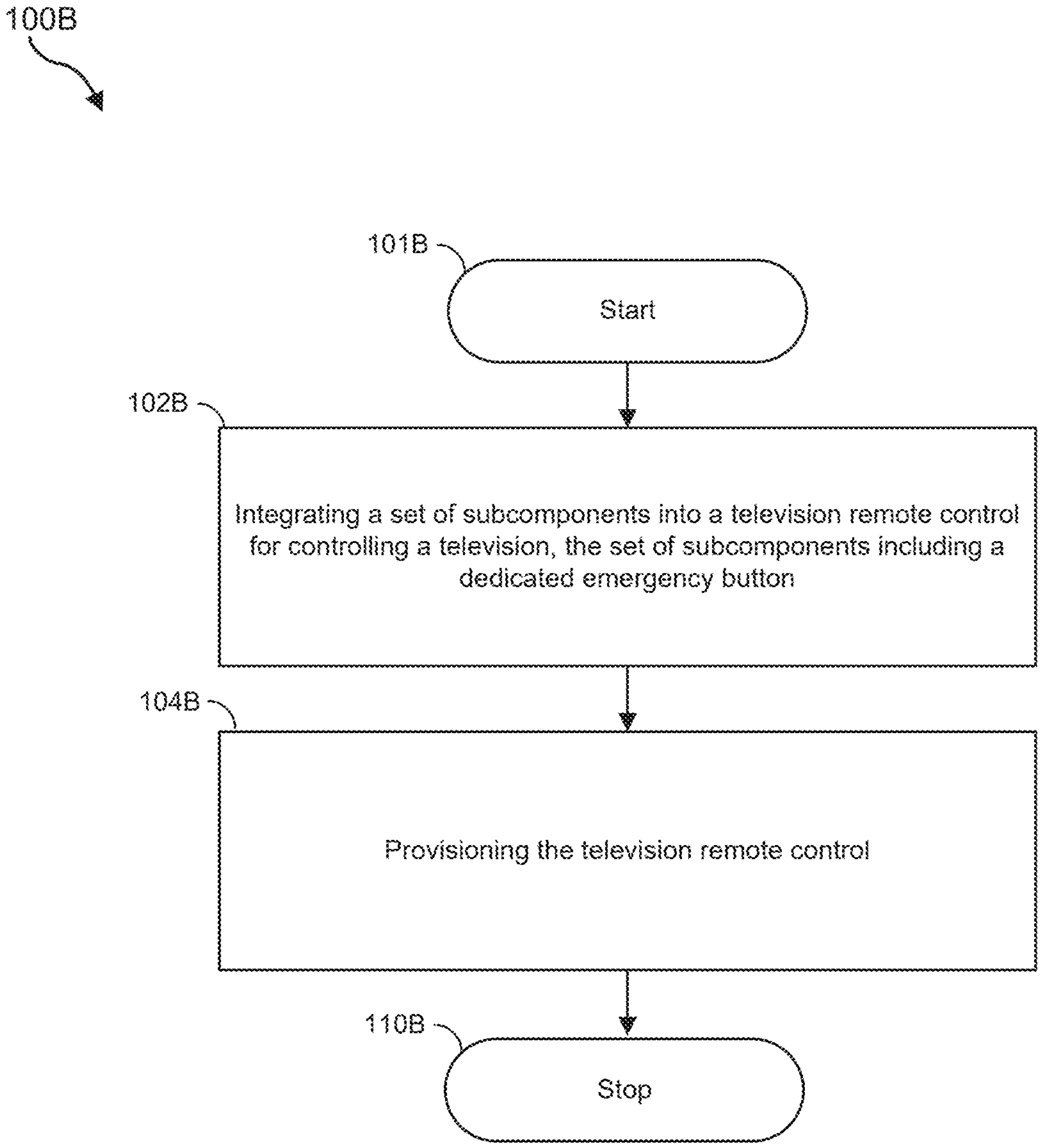
FIG. 1B shows a flow diagram for another method relating to a television remote control including senior living applications.

Similarly, FIG. 1B shows flow diagram for a method 100B relating to a television remote control including senior living applications. At step 101B method 100B may start or begin. At step 102B, method 100B may include integrating a set of subcomponents into a television remote control for controlling a television. The set of subcomponents may include a radiofrequency or infrared transmitter that enables transmission of messages from the television remote control to a receiving device, a directional input pad that enables navigating between different icons or options within a user interface, a select button that enables a particular icon or option to be selected or commanded, a power button that toggles between on and off, a volume button that enables a degrec of volume to be increased or decreased, a microcontroller that executes instructions to implement the television remote control, and/or a dedicated emergency contact button that is configured such that pressing the dedicated emergency contact button triggers a message from the transmitter of the television remote control commanding a receiving device to call a phone number configured as an emergency contact. At step 104B, method 100B may include provisioning the television remote control. At step 110B, method 100B may stop or conclude.

Figure 2:
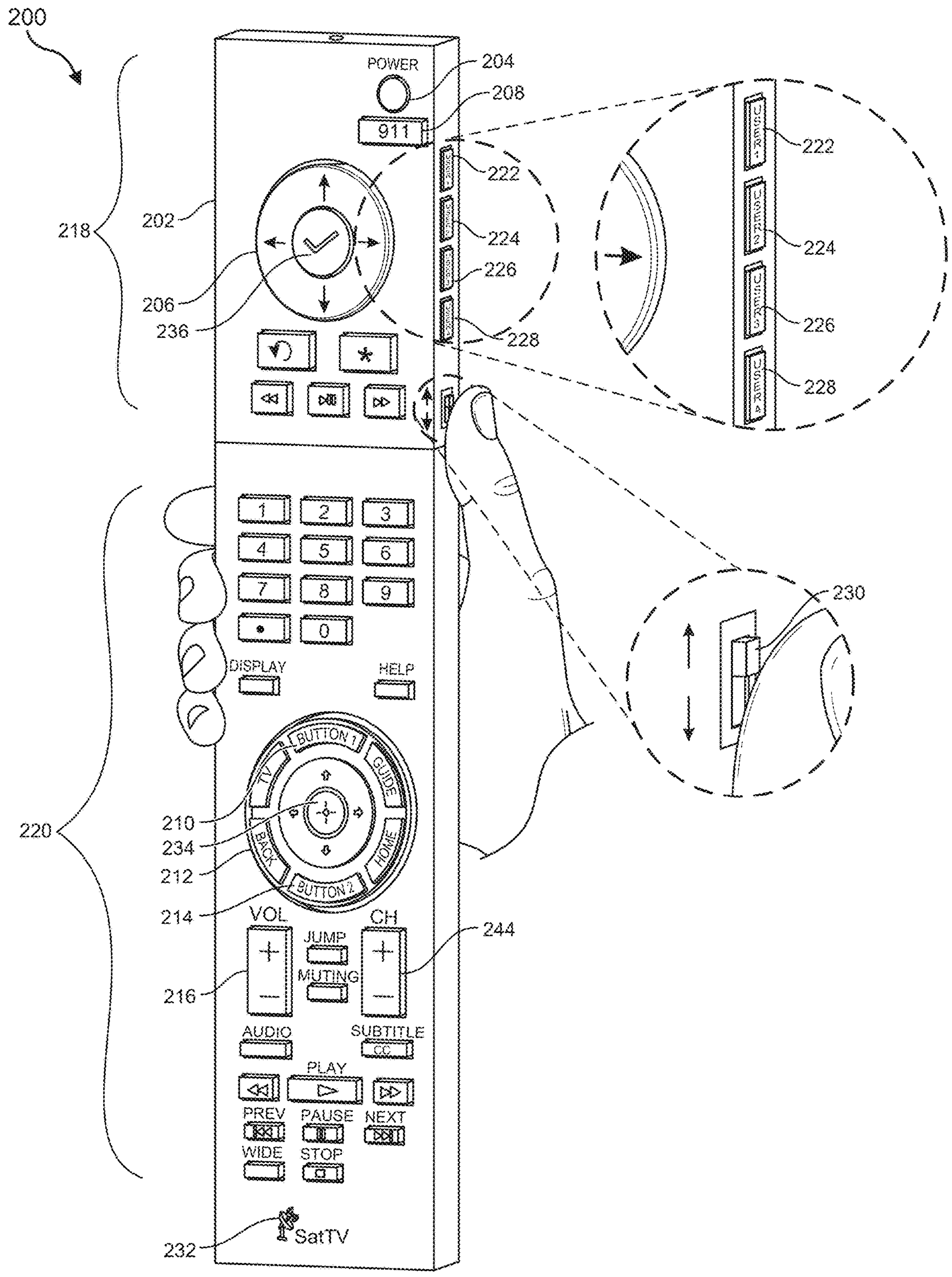
FIG. 2 shows a diagram of an example embodiment of the television remote control.

FIG. 2 shows a diagram 200 of an example embodiment of a television remote control 202. Diagram 200 can help to illustrate how, in some examples, integrating the subcomponents produces the television remote control such that the television remote control includes a simpler button set that facilitates senior living and the television remote control also includes a more complex button set that provides a user with more complicated and more comprehensive functionality than the simpler button set. In these examples, the television remote control can also include a switch that switches between enabling the simpler button set and the more complex button set.

As shown, diagram 200 may include a power button 204, a directional input pad 206, and a select button 236. Diagram 200 also shows a number of self-explanatory buttons that may be associated with television remote controls and which are not necessarily numbered within diagram 200. As shown, some permutation of the buttons outlined above may be part of a simpler button set 218, which can be physically or otherwise divided from a more complex button set 220. Although not necessarily shown in diagram 200, in some examples the simpler button set includes at least one instance of the power button that toggles between on and off and the more complex button set includes an additional instance of the power button that toggles between on and off.

With respect to more complex button set 220, diagram 200 further shows that television remote control 202 may include a generic button 210, a generic button 214, a directional input pad 234, a back button 212, a volume button 216, a channel button 244, and a logo 232, for example.

Additionally, diagram 200 also further illustrates how television remote control 202 may include a dedicated user profile button 222, a dedicated user profile button 224, a dedicated user profile button 226, and/or a dedicated user profile button 228. In the illustrative example of this figure, one or more of the dedicated user profile buttons may be positioned on a slender, lateral, or other face of television remote control 202. Those having skill in the art will readily ascertain that the use of four separate dedicated user profile buttons corresponds to merely one illustrative embodiment, whereas in other examples any suitable number or permutation of dedicated user profile buttons may be used.

Diagram 200 also further shows how television remote control 202 may include a switch 230. In the illustrative example of this figure, switch 230 may take the form of a mechanical or physical switch button that can be toggled or slid from one position to an opposite position, as shown. Nevertheless, those having skill in the art can readily ascertain that, in other examples, any suitable mechanical, hardware, and/or software switch or mechanism may be used, as discussed in more detail below with respect to various additional or alternative embodiments of television remote control 202 described throughout this disclosure.

Although the various diagrams within this disclosure show a particular permutation of buttons within simpler button set 218 and a distinct particular permutation of buttons within more complex button set 220, these particular permutations of buttons are merely examples for illustrative purposes. As shown, either of the button sets may include additional instances of effectively the same button between simpler button set 218 and more complex button set 220. For example, directional input pad 206 is included within simpler button set 218, whereas directional input pad 234 is included within more complex button set 220. Simultaneously, one or more of the buttons within simpler button set 218 and/or more complex button set 220 may be unique to the particular set of buttons at which that button is found. Generally speaking, more complex button set 220 may, by definition, include one or more additional instances or types of buttons that are not necessarily found within simpler button set 218. For example, more complex button set 220 may include a number keypad, an audio button, a stop button, a subtitle button, etc., as shown. Those having skill in the art will readily ascertain that more complex button set 220 and/or simpler button set 218 may further include a wide variety of other different types of television remote control buttons, as appropriate. Nevertheless, despite these variations, diagram 200 helps to highlight and illustrate the overall inventive concept of providing two separate button sets, including a simpler button set and a more complex button set, such that the simpler button set facilitates senior living by providing a simplified set of buttons for senior citizens to use while nevertheless retaining the option for another individual, such as a non-senior citizen, to use the remaining and more complex button set as appropriate.

Although not necessarily depicted in diagram 200, in some examples, television remote control 202 may include a third, intermediary, and/or shared button set. By way of illustrative example, directional input pad 206 and directional input pad 234 may be combined into a single directional input pad. The single directional input pad may belong to a third, intermediary, and/or shared button set. Thus, a senior citizen could use simpler button set 218 (with directional input pad 206 removed) in combination with the shared directional input pad, whereas a non-senior citizen would retain the option to use more complex button set 220 in combination with the same pad. In the case of a mechanical or other slide or switch to switch between simpler button set 218 and more complex button set 220, the slide or switch may obscure the more complex button set when the simpler button set is toggled while nevertheless failing to obscure the shared button set when the more complex button site is toggled, thereby enabling a senior citizen to use the simpler button set and the shared button set in combination while also allowing a non-senior citizen to use the more complex button set in combination with the shared button set (see also FIG. 4B). In such examples, the shared button set may be disposed in between the simpler button set and the more complex button set.

Figure 3:
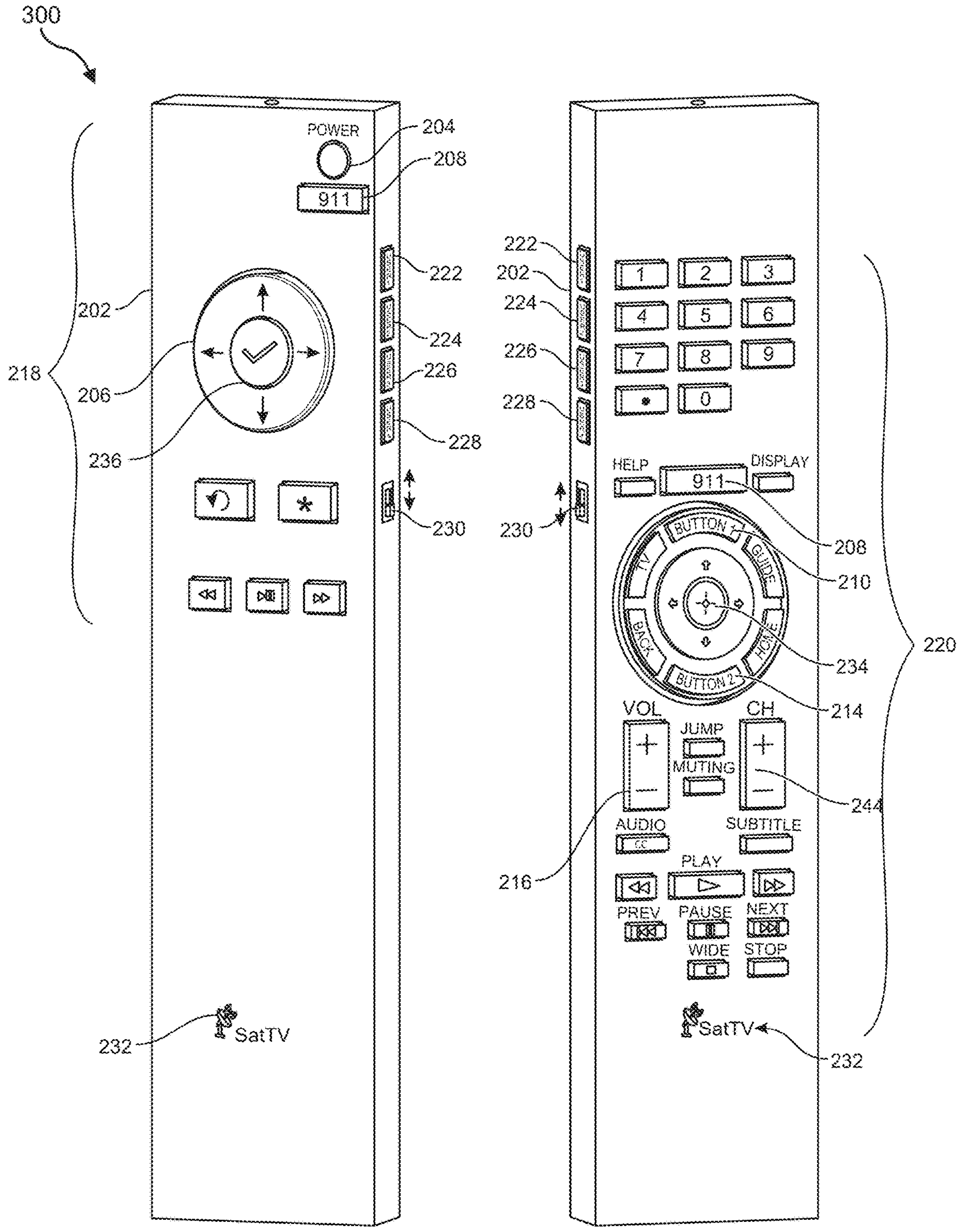
FIG. 3 shows a diagram of an example embodiment of the television remote control with a simpler button set on one face and a more complex button set on an opposite face that is opposite of the one face.

FIG. 3 shows a diagram 300 of an example embodiment of television remote control 202 with simpler button set 218 on one face and more complex button set 220 on an opposite face that is opposite of the one face. In this example, the use of two separate and opposite faces of television remote control 202 may effectively divide or delineate simpler button set 218 from more complex button set 220.

Figure 4A:
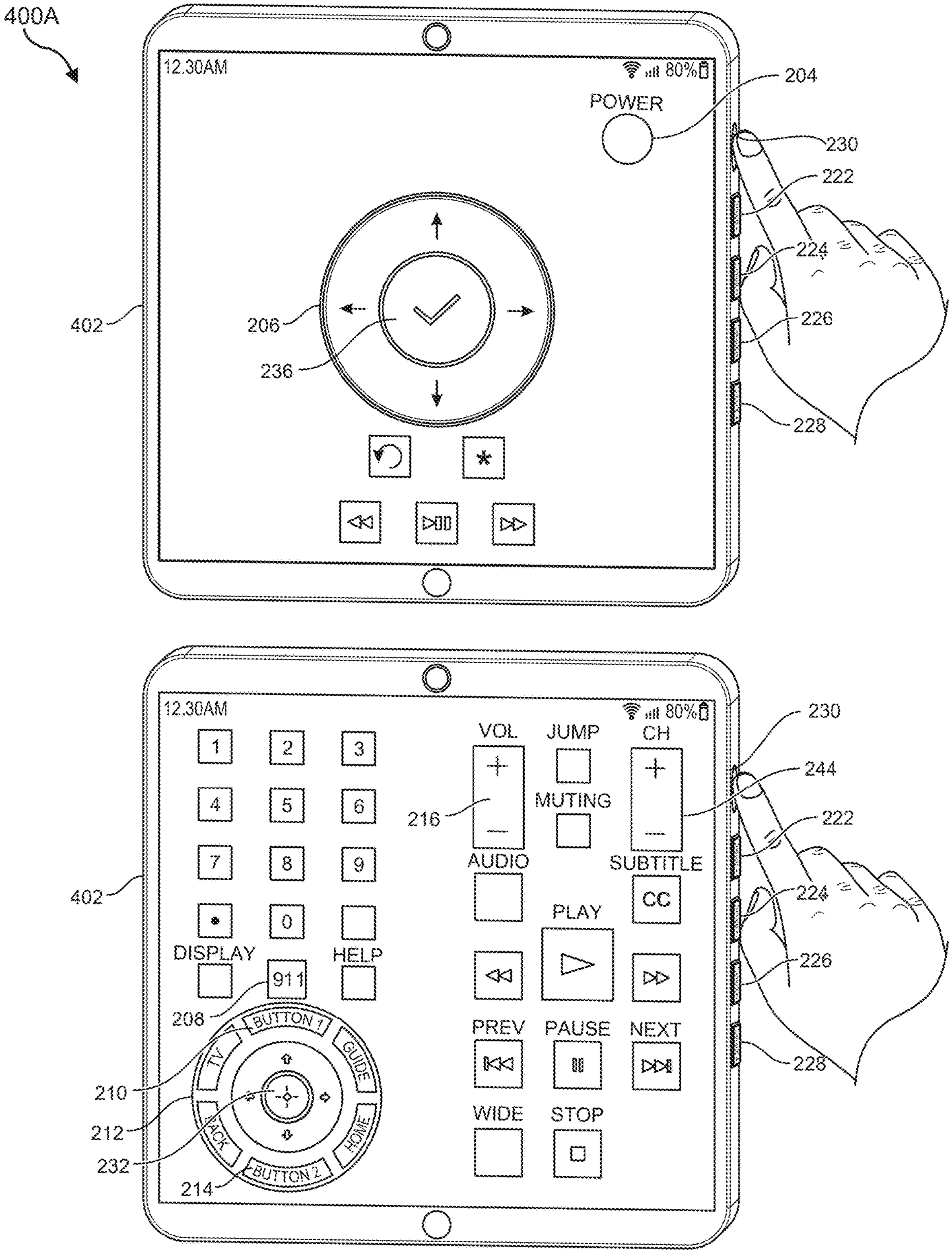
FIG. 4A shows a diagram of an example embodiment of the television remote control implemented on a tablet with a touchscreen interface.

FIG. 4A shows a diagram 400A of an example embodiment of the television remote control implemented on a tablet 402 with a touchscreen interface. The television remote control may include some, substantially some, and/or all of the buttons shown within diagram 200. For case of discussion, diagram 400A generally uses the same reference numerals as in diagram 200. Accordingly, diagram 400A further shows how a user may toggle switch 230, which may trigger tablet 402 to switch between the simpler button set, which can correspond to the top sub-diagram of diagram 400A, and the more complex button set, which can correspond to the bottom sub-diagram of diagram 400A.

Figure 4B:
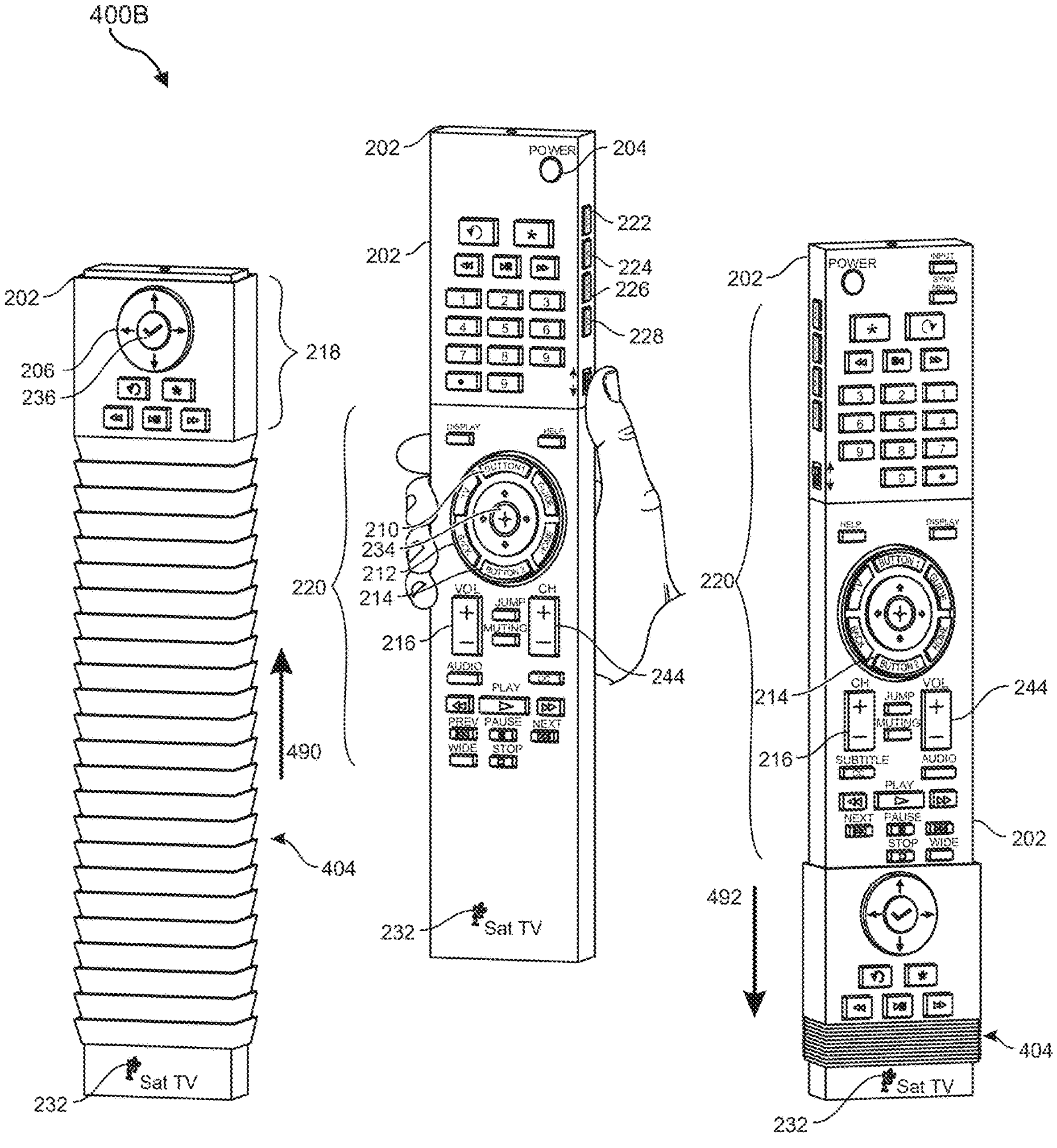
FIG. 4B shows a diagram of an example embodiment of the television remote control including a switch that enables the simpler button set to slide over the more complex button set.

FIG. 4B shows a diagram 400B of an example embodiment of television remote control 202 including a switch that enables the simpler button set to slide over the more complex button set. In the illustrative example of this figure, simpler button set 218 may be disposed at the tip of an extendable, slidable, and/or compressible cover 404 that may slide over a base or foundation component of television remote control 202 on which more complex button set 220 is disposed, as shown. (For clarity and case of discussion, the middle sub-diagram in diagram 400B shows the base component with cover 404 removed.) Directional arrow 490 and directional arrow 492 show the direction in which cover 404 may be extended upward or downward to thereby toggle between simpler button set 218 and more complex button set 220. In view of the above, for a senior citizen user, cover 404 may be extended upward, thereby obscuring more complex button set 220, while nevertheless retaining or showing simpler button set 218, which can present a simpler and casier to navigate interface to a corresponding television that the senior citizen can more readily understand and interact with. In contrast, a non-senior citizen user, such as a nurse, doctor, administrator, parent, or second-hand buyer, retains the option to lower cover 404, as shown in the right sub-diagram of diagram 400B, which further reveals more complex button set 220. In some examples, the switch is configured such that the switch disables the simpler button set when enabling the more complex button set or the switch disables the more complex button set when enabling the simpler button set.

In the illustrative example of this figure, simpler button set 218 remains revealed on the surface of cover 404 even when cover 404 has been compressed downward to enable more complex button set 220. Nevertheless, those having skill in the art can readily ascertain that, in additional or alternative examples, a mechanical, hardware, software, and/or other switch may be used that obscures simpler button set 218 when more complex button set 220 is toggled or revealed. For example, both simpler button set 218 and more complex button set 220 may be disposed on the surface of the same base component of television remote control 202, but on opposite ends of the same base component, such that a slidable cover may slide from one end to the opposite end of the base component and obscuring the corresponding button set at the opposite end of the base component (and vice versa).

Figure 4C:
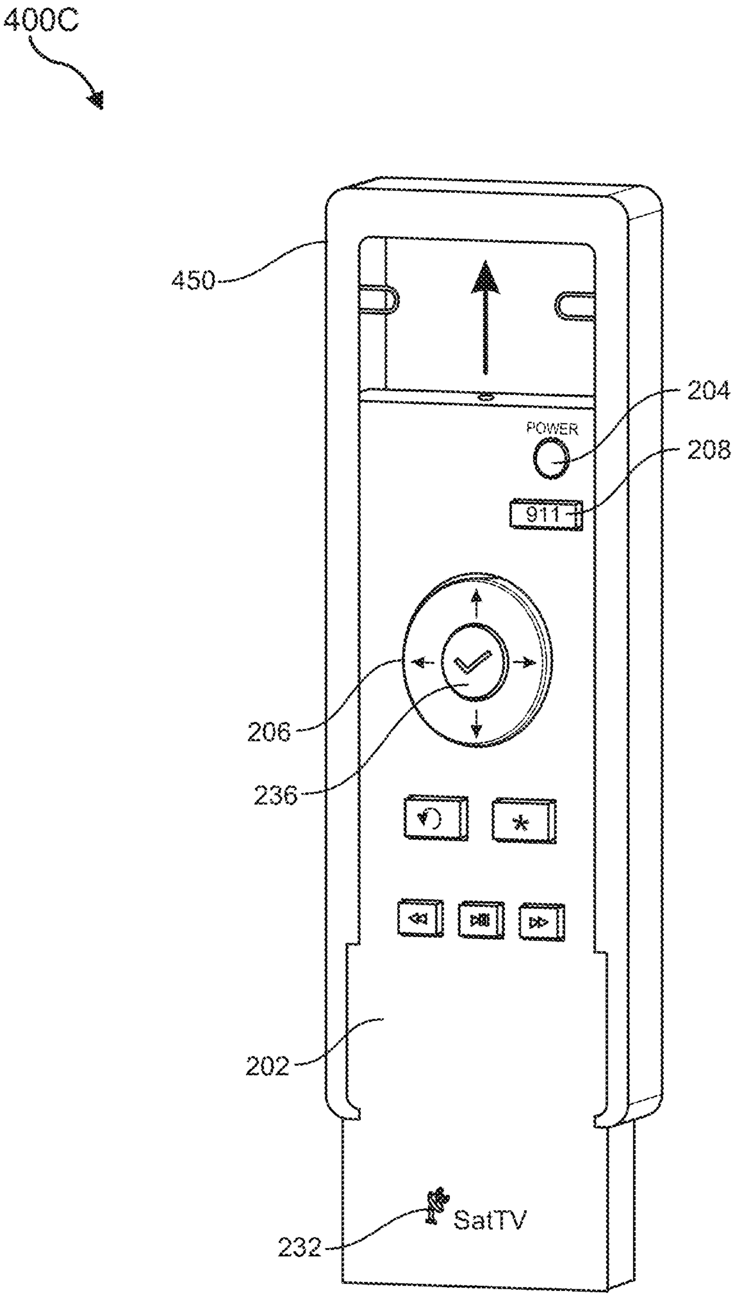
FIG. 4C shows a diagram of an example embodiment of the television remote control in which a subcomponent including the simpler button set can be inserted into a larger subcomponent or chassis.

FIG. 4C shows a diagram 400C of an example embodiment of television remote control 202 in which a subcomponent including the simpler button set can be inserted into a larger chassis 450, which can form the basis on which the more complex button set is disposed. For example, more complex button set 220 may optionally be disposed on an inward face of chassis 450 such that the viewer of diagram 400C would see and have access to more complex button set 220 until the subcomponent is inserted into chassis 450. Additionally, or alternatively, the more complex button set may be disposed on the outward side of the same face of chassis 450. Those having skill in the art will readily ascertain that the examples outlined above are merely used for illustrative purposes and, in other examples, any suitable sliding or combination mechanism may be used to unite the simpler button set and the more complex button set in accordance with one or more of the various embodiments and inventive concepts described within this disclosure.

Figure 5:
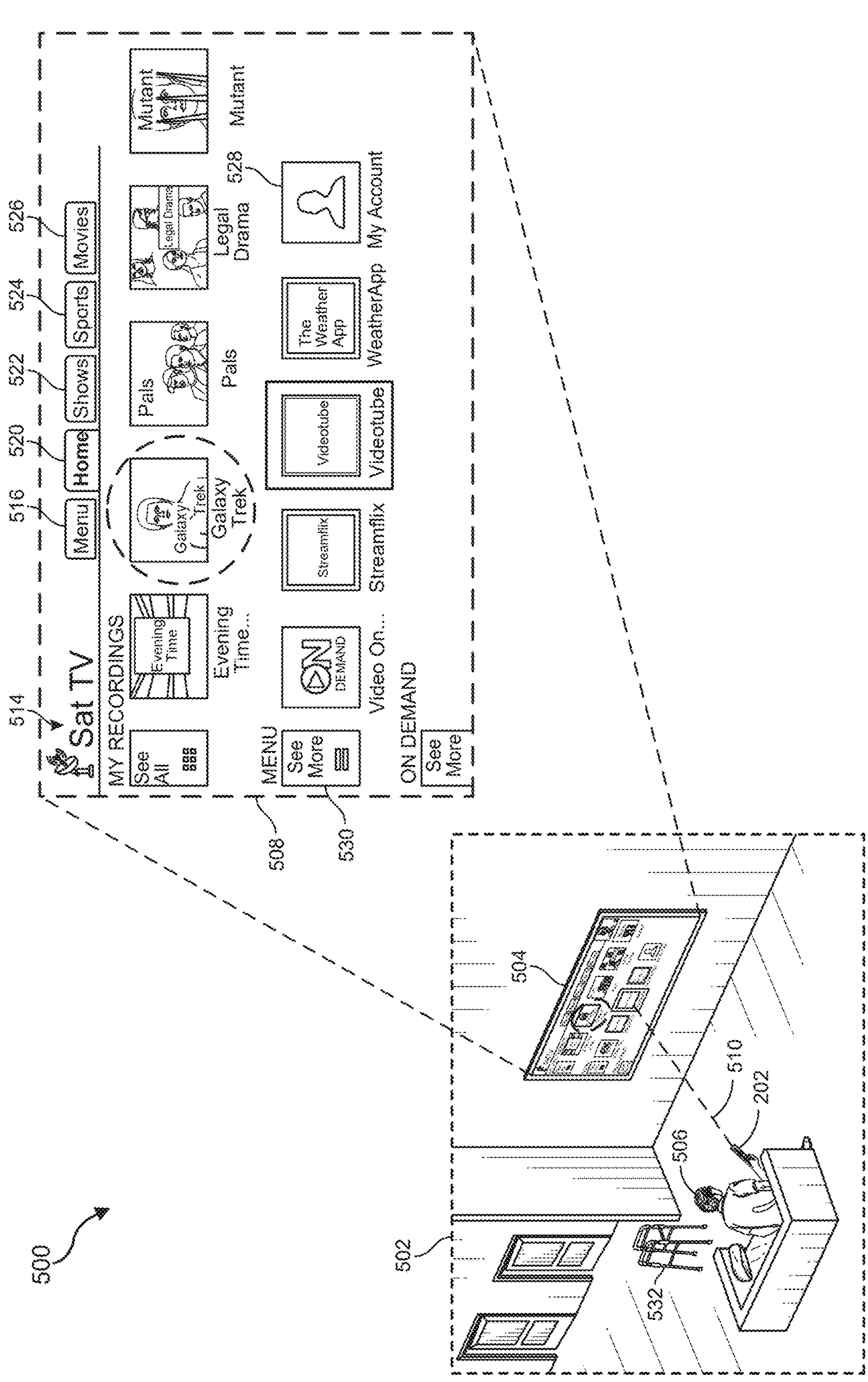
FIG. 5 shows a diagram of an example embodiment of the television remote control that uses a laser light interface to facilitate senior living.

FIG. 5 shows a diagram 500 of an example embodiment of television remote control 202 that uses a laser light interface to facilitate senior living. In particular, diagram 500 shows a sub-diagram 502 that includes a television 504, a user 506, television remote control 202, and corresponding laser light 510. User 506 may correspond to a patient or resident within a senior living facility, as further suggested by a walker 532. Diagram 500 also includes a sub-diagram 508 of the contents shown on television 504, which can include a logo 514, a menu button 516, a home button 520, a shows button 522, a sports button 524, a see more button 530, a movies button 526, and a user account button 528, as well as various other software for explanatory buttons, as shown.

Figure 6A:
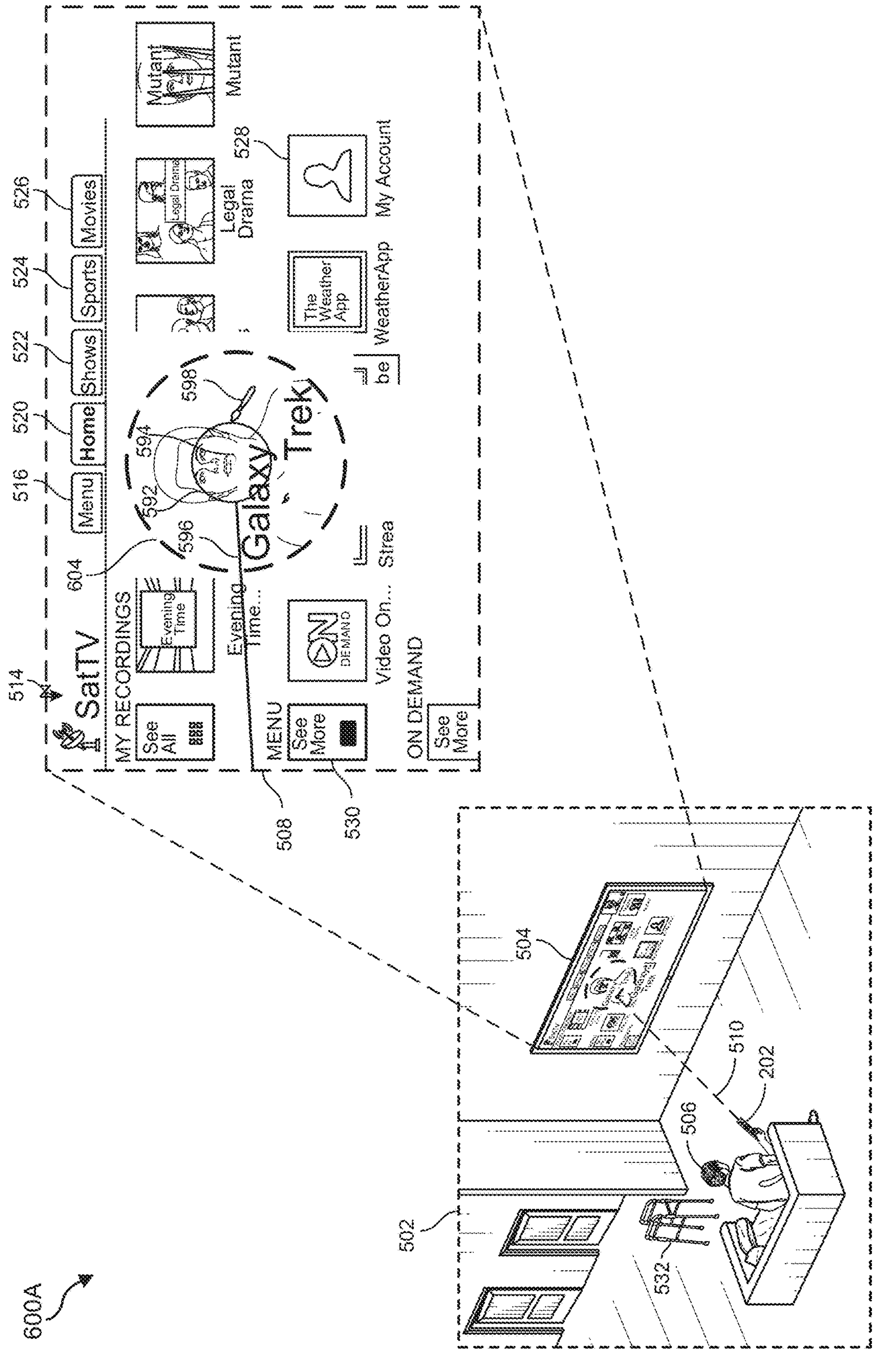
FIG. 6A shows a diagram of an example embodiment of the television remote control according to which an area of focus on a display is magnified when centered around a tip of the laser light.

FIG. 6A shows a diagram 600A of an example embodiment of television remote control 202 according to which an area of focus on a display is magnified when centered around a tip of laser light 510. In other words, rather than merely using an infrared light, as with some traditional television remote controls, in various examples television remote control 202 may be equipped with laser light 510 such that a circle 604 is shown in which a magnified portion of the display of the corresponding television is effectively magnified. An indicator 596 shows how the tip of laser light 510 may have been drawn or moved across the surface of the corresponding television until a tip 594 of laser light 510 arrives at the location shown in sub-diagram 508 of diagram 600A. A figurative paintbrush indicator 598 further indicates to the reader how user 506 may execute one or more hand gestures or motions, such as a circular, circle, or looping motion, such as a circle 592, around the specific icon or button, or other menu element, that the user would like to actually select or toggle. In other words, the hand gesture (e.g., drawing a loop or circle 592) indicated by figurative paintbrush indicator 598 may effectively substitute for the user pressing an ok, select, or command button, such as select button 236 (sec FIG. 2). In some examples, one or more of indicator 596, tip 594, circle 604, and/or circle 592 may be visually drawn or depicted on the screen of the corresponding television for the benefit of user 506 to thereby have a better understanding of where laser light 510 is actually drawing.

Figure 6B:
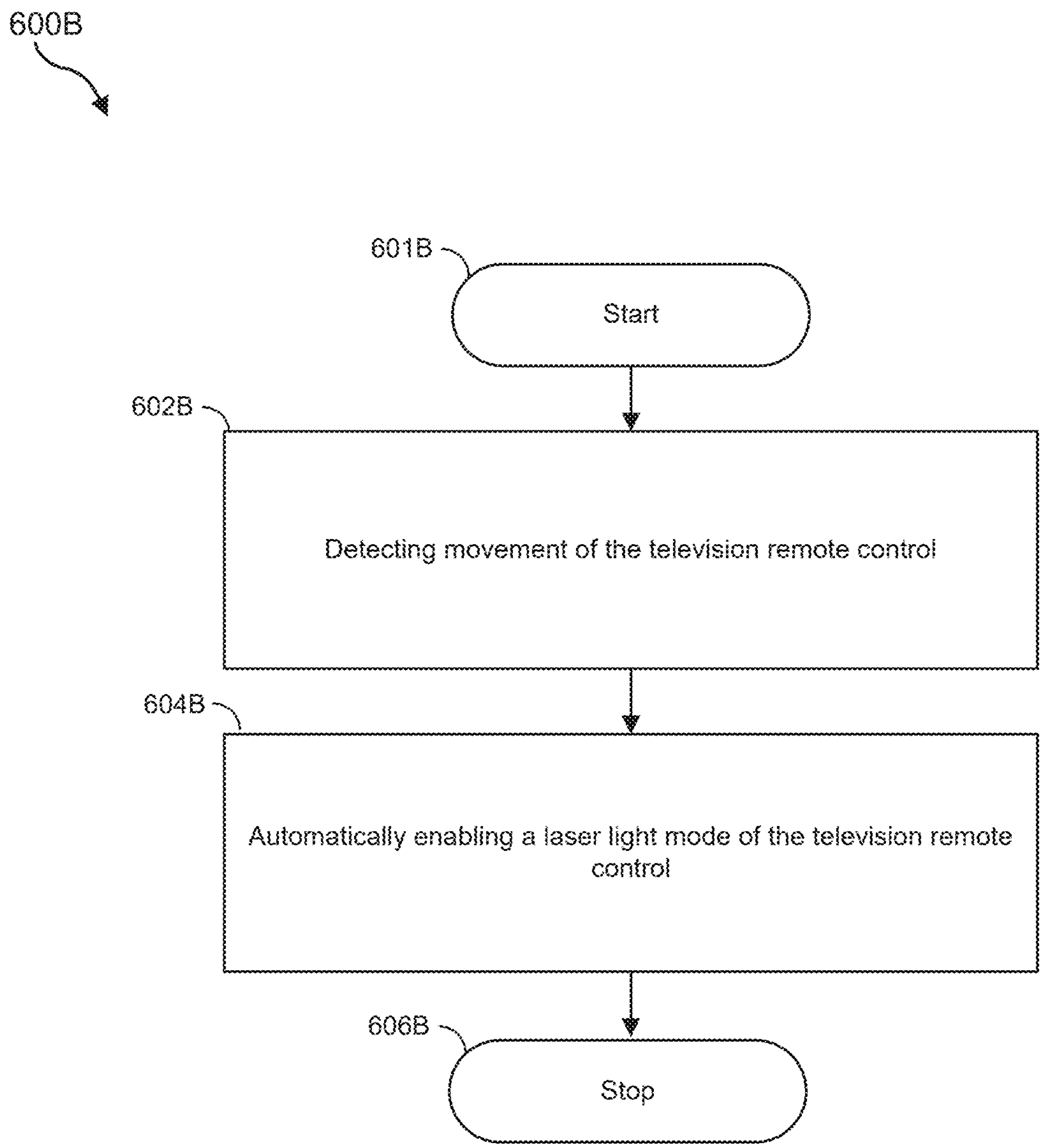
FIG. 6B shows a flow diagram for a method relating to activating or deactivating the laser light embodiment.

FIG. 6B shows a flow diagram for a method 600B relating to activating or deactivating the laser light embodiment. At step 601B, method 600B may start or begin. At step 602B, method 600B may include detecting movement of the television remote control. At step 604B, method 600B may include automatically enabling a laser light mode of the television remote control. At step 606B, method 600B may stop or conclude. Enabling the laser light mode may trigger the omission of the corresponding laser light from the television remote control. Similarly, enabling the laser light mode may optionally trigger display of one or more of indicator 596, tip 594, circle 604, and/or circle 592, as further discussed above. Moreover, enabling the laser light mode may also trigger the magnification of the corresponding subset of the screen of the corresponding television, as further discussed above. Furthermore, enabling the laser light mode may also trigger or enable the ability to select an icon or button using a hand gesture, as discussed above in connection with circle 592, rather than select button 236. In some examples, the television remote control, the receiving device, and/or the television may monitor for movement of the television remote control and a continuous, periodic, and/or otherwise scheduled manner. Step 602B of detecting movement of the television remote control may be performed as part of this monitoring process. Additionally, or alternatively, in some examples the television remote control may include a passive element that automatically issues an alert indicating movement of the television remote control in response to movement of the television remote control, without necessarily including any active or electrical monitoring procedures. In various examples, limiting the emitting of the corresponding laser light to those times corresponding to the detection of movement of the television remote control may help to save battery energy, for example.

Figure 6C:
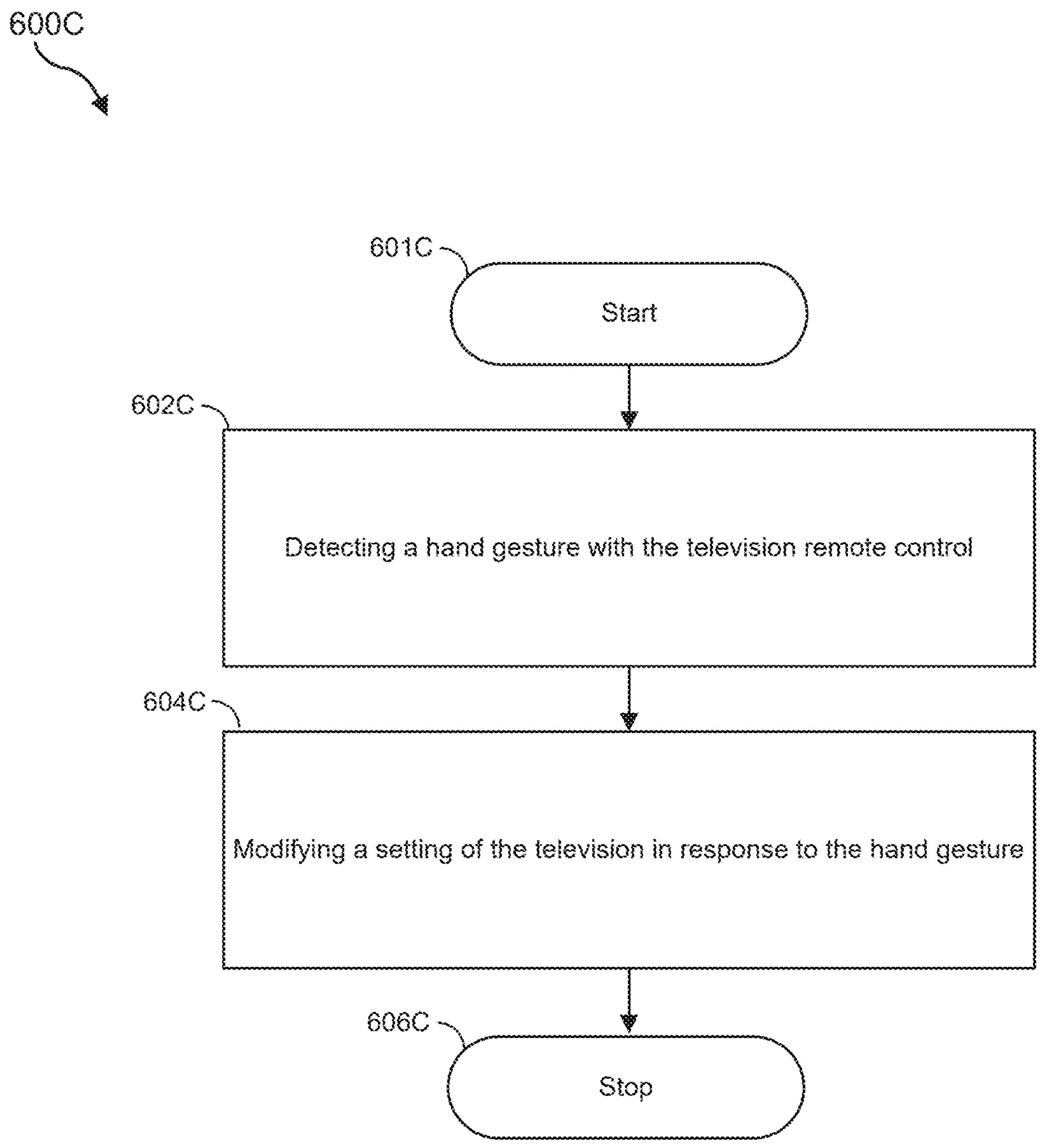
FIG. 6C shows a flow diagram for a method relating to adjusting television or other settings using one or more simple hand gestures with the television remote control.

FIG. 6C shows a flow diagram for a method 600C relating to adjusting television or other settings using one or more simple hand gestures with television remote control 202. At step 601C, method 600C may start or begin. At step 602C, method 600C may include detecting a hand gesture with the television remote control. At step 604C, method 600C may include modifying the setting of the television in response to the hand gesture. At step 606C, method 600C may stop or conclude. Thus, in contrast to related methodologies that use gestures to detect commands within a videogame or virtual reality system, this disclosure envisions embodiments where gestures can be used to substitute for simpler or more traditional commands that may nevertheless increase the level of difficulty, challenge, or complication for senior citizens and other individuals, as further discussed above. For example, rather than pressing a particular hardware or software button, which can require actually locating the button, reading the fine print labeled over the button, or even knowing what the name of the corresponding button would be, the senior citizen can use natural or intuitive gestures to modify one or more traditional television settings accordingly. Such traditional or other television settings can include increasing or decreasing volume and/or increasing or decreasing a channel number, as discussed in more detail below regarding FIG. 6D and FIG. 6E.

Figure 6D:
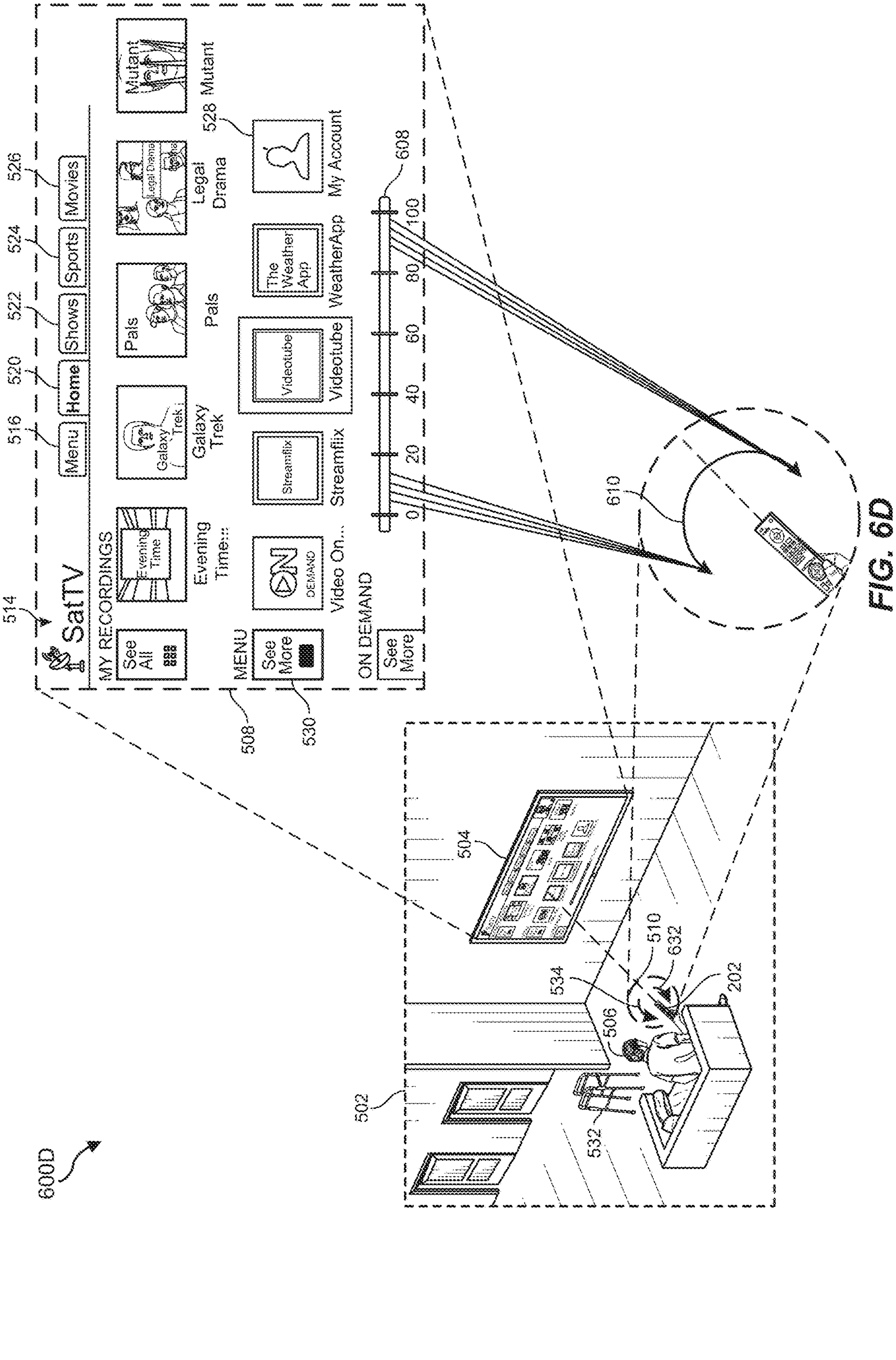
FIG. 6D shows a diagram illustrating the increasing or decreasing of volume using one or more simple hand gestures with the television remote control.

FIG. 6D shows a diagram 600D illustrating the increasing or decreasing of volume using one or more simple hand gestures with television remote control 202. As further shown within diagram 600D, user 506 may initiate or execute a hand gesture or other gesture in order to modify the volume setting on the corresponding television. By way of illustrative example, an indicator 610 illustrates how the hand gesture may correspond to a horizontal motion moving the wrist left and right, which can proportionally increase or decrease a horizontal volume bar 608, as shown. Sub-diagram 502 within 600D also shows an indicator 632 illustrating the corresponding rotation or wrist-flicking motion that may correspond to increasing or decreasing the volume.

Figure 6E:
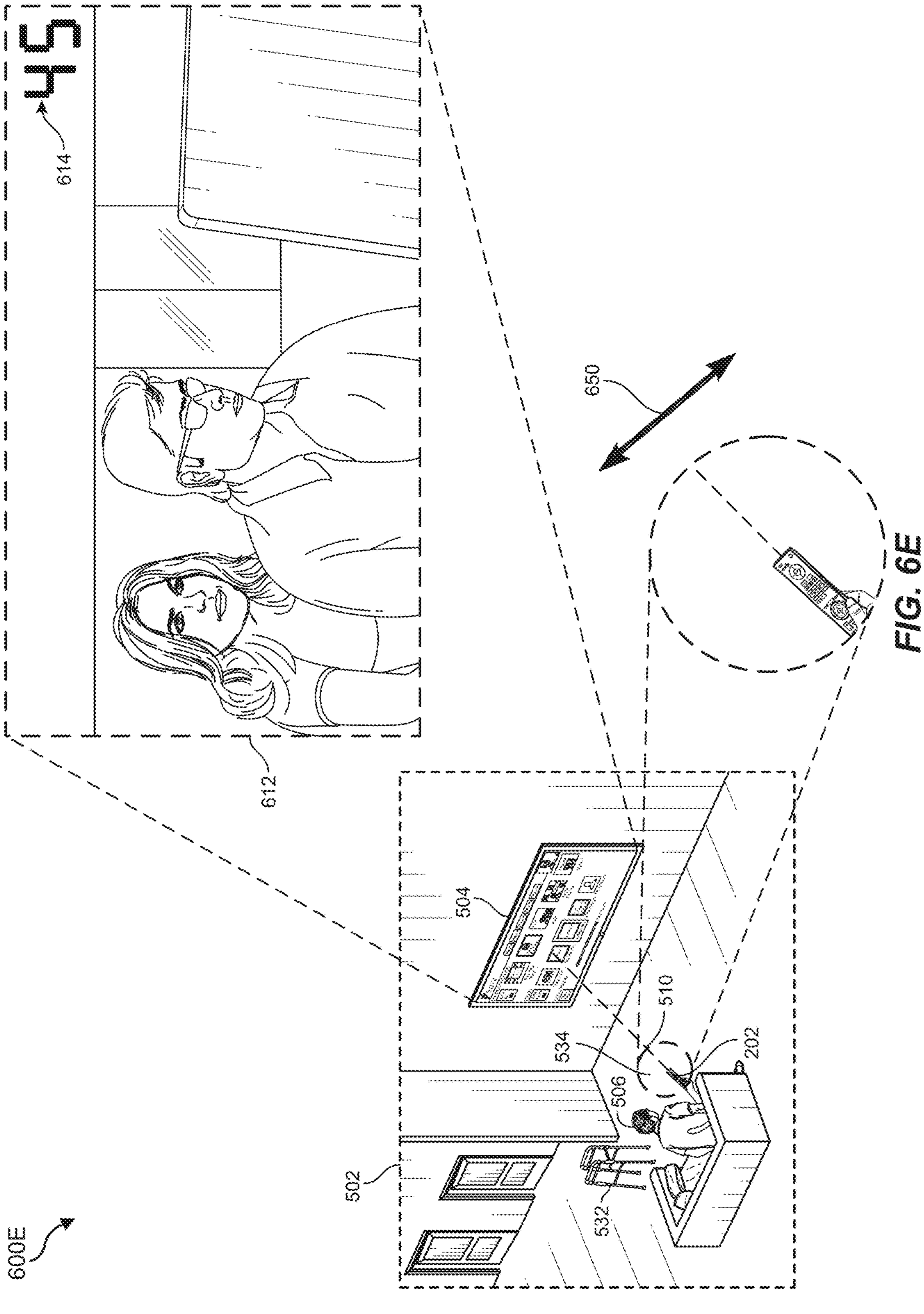
FIG. 6E shows a diagram illustrating the switching of channels or decreasing or increasing the channel number using one or more simple hand gestures with the television remote control.

Additionally, or alternatively, FIG. 6E shows a diagram 600E illustrating the switching of channels or decreasing or increasing the channel number using one or more simple hand gestures with television remote control 202. In particular, an indicator 650 shows how user 506 may initiate or execute a gesture moving television remote control 202 vertically upward or downward (i.e., perpendicular to the motion of diagram 600D), thereby increasing or decreasing another television setting, such as the channel number. Sub-diagram 612 shows the corresponding television displaying an arbitrary image from a television channel, which in the alternative example of this figure corresponds to "45," as shown by indicator 614. With respect to diagram 600D and 600E, in some examples the user may optionally maintain the wrist and/or base of the hand in a relatively or substantially stable or unmoving position while flicking, moving, or rotating the more distal remote and/or finger portions of the hand and/or television remote control 202 (e.g., more of a rotating movement around the wrist rather than translational movement that moves the entire hand up or down, etc.).

Figure 6F:
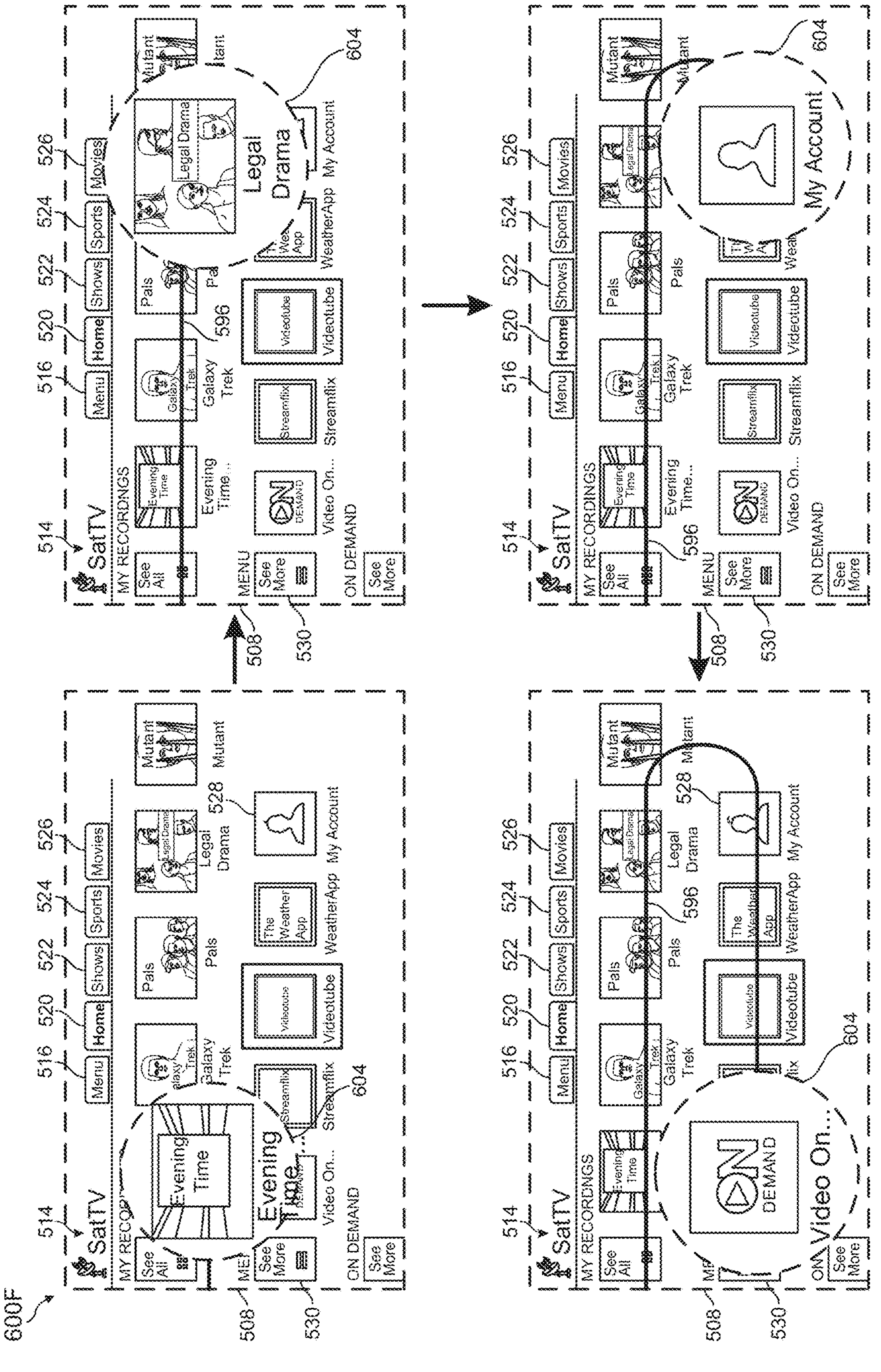
FIG. 6F shows a diagram illustrating how the subset of the television screen that is shown as magnified may change as a user moves the tip of the laser light across the television screen.

Similar to FIG. 6A, FIG. 6F shows a diagram 600F illustrating how the subset of the television screen that is shown as magnified may change as a user moves the tip of the laser light across the television screen. In particular, diagram 600F shows how circle 604 and/or indicator 596 may trace a path as the user moves or points tip 596 in a sweeping motion across the screen, as shown. In particular, diagram 600F includes a top-left version of sub-diagram 508, a top-right version of sub-diagram 508, a bottom-left version of sub-diagram 508, and a bottom-right version of sub-diagram 508. In the top-left version of sub-diagram 508, circle 604 may magnify the button or icon corresponding to the television program "Evening Time." In the top-right version of sub-diagram 508, circle 604 may magnify the button or icon corresponding to the television program "Legal Drama." In the bottom-left version of sub-diagram 508, circle 604 may magnify the button or icon corresponding to the television program or channel "Video-On-Demand." Lastly, in the bottom-right version of sub-diagram 508, circle 604 may magnify the button or icon corresponding to "My Account" button 528, as further discussed above. Thus, diagram 600F generally shows how the user may sweep tip 596 from "Evening Time" in the top-left version of sub-diagram 508 to "Legal Drama" in the top-right version of sub-diagram 508 to "My Account" in the bottom-right version of sub-diagram 508 and finally to "Video-on-Demand" in the bottom-left version of sub-diagram 508, as shown.

Figure 7:
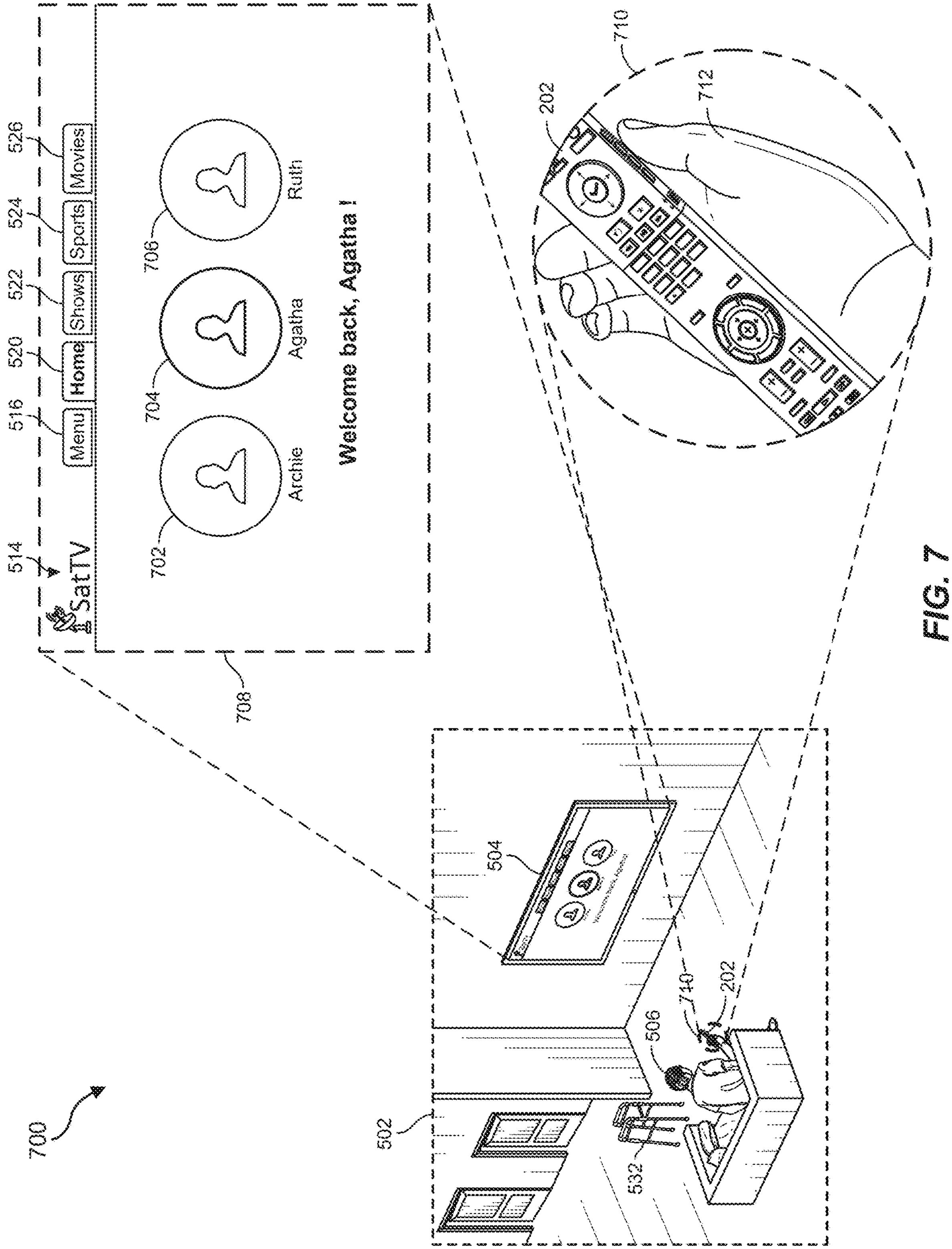
FIG. 7 shows a diagram illustrating use of a dedicated user profile button on the television remote control.

FIG. 7 shows a diagram 700 illustrating use of a dedicated user profile button on television remote control 202. In particular, a sub-diagram 710 shows how a hand 712 of the user may toggle, using the user's thumb, a particular one of dedicated user profile button 222, dedicated user profile button 224, dedicated user profile button 226, and/or dedicated user profile button 228. As used herein, the adjective "dedicated" can generally refer to a button or input decidedly having a particular function or purpose, as labeled, as manufactured, as advertised, as sold, as engineered, and/or as understood by those having skill in the art. By analogy, the power button on a simple and traditional television remote control is "dedicated" in the sense that the traditional television remote control was designed for the power button to serve the particular purpose of turning power on or off. In contrast, a computer gamer who uses the "enter" key on a classic computer keyboard to trigger a rocket launch within a videogame would not constitute a button that is "dedicated" to the rocket launch functionality, because the button was designed for a much more generic purpose rather than being engineered and/or advertised for the specific purpose of triggering rocket launches. Accordingly, one inventive concept of this disclosure involves the use of dedicated emergency contact button 208 and/or a dedicated user profile button, such as the dedicated user profile buttons shown within sub-diagram 710 and/or diagram 200. In some examples, the dedicated user profile button may be included in the simpler button set such that pressing the dedicated user profile button in the simpler button set triggers the message from the transmitter of the television remote control indicating that the specific user preference profile, from among the plurality of stored user preference profiles, is activated and enables the receiving device that receives the message from the transmitter to adjust a display in accordance with preferences of the specific user preference profile.

In view of the above, the various dedicated user profile buttons of television remote control 202 may be dedicated to the functioning of toggling a particular and/or unique user profile. In the illustrative example of this figure, a particular dedicated user profile button, such as dedicated user profile button 222, may have been assigned to particular user, which in this case may correspond to a senior citizen named Agatha. Sub-diagram 708 within diagram 700 shows that a particular menu provided by a satellite television service may prompt user 506 to select a particular user profile, such as a user profile 702, a user profile 704, and a user profile 706. Those having skill in the art will understand that the example of the satellite television service providing the menu of user profiles is merely illustrative.

Additionally, or alternatively, in other examples the television itself, a digital media player and/or smart TV (e.g., a Roku or Apple TV device), and/or a digital media player application may further prompt and/or enable a plurality of distinct user profiles, which may respectively store varying preferences for each respective user. Accordingly, in a related methodology user 506 may manually press one or more buttons to navigate toward user profile 702, user profile 704, and/or user profile 706 and then press select button 236. In contrast, sub-diagram 710 illustrates how a senior citizen may more conveniently select or press a particular dedicated user profile button, such as dedicated user profile button 222. Upon pressing dedicated user profile button 222, one or more receiving devices may understand that the user profile corresponding to Agatha should be activated and/or the corresponding preferences of Agatha should be applied. The usage of dedicated user profile buttons and/or the application of respective user profile preferences will be discussed further below in this disclosure in greater detail in connection with diagram 1100 of FIG. 11. Returning to diagram 700, in a parallel manner, if and when a different user, such as Archie or Ruth (see sub-diagram 708) uses the television remote control and desires to apply his or her own corresponding user profile, then this other individual may press a distinct one of the plurality of dedicated user profile buttons, such as dedicated user profile button 224, dedicated user profile button 226, and/or dedicated user profile button 228. In other words, the respective different dedicated user profile buttons may be mapped to respective different user profiles such that pressing a particular dedicated user profile button automatically activates and/or applies the corresponding user profile and/or preferences of a particular user to which the dedicated user profile button has been mapped. In the context of a senior living facility or other individual with limited capacity, the mapping and/or setup procedure may be performed by, or performed with the assistance of, a senior living assistant, nurse, doctor, administrator, family member, friend, etc.

In view of the above, the user may press the dedicated user profile button in a manner that automatically selects or toggles the corresponding user profile, thereby bypassing or avoiding any need to navigate a cursor or highlight on the particular user profile. For example, even in a scenario where the cursor or highlight is currently focused upon user profile 702 and/or user profile 706, user 506 may automatically select or toggle user profile 704 by pressing the appropriate dedicated user profile button, such as dedicated user profile button 222, without any need to manipulate a directional input pad and/or otherwise move the cursor or highlight onto user profile 704. In other words, upon pressing the appropriate dedicated user profile button the cursor or highlight may automatically jump to user profile 704 and furthermore may automatically select or toggle user profile 704.

Although diagram 700 focuses on the example where one or more screens prompts the user to select a particular user profile, which can be performed by pressing one or more dedicated user profile buttons, as further discussed above, in other examples the user may not be prompted. In these other examples, the user himself or herself may initiate the activation or application of the corresponding user profile by pressing the appropriate dedicated user profile button, which can be performed while watching a television show and/or when the television devices boot up, for example, without necessarily requiring a prompting. Optionally, after the user successfully presses a particular dedicated user profile button, then the system may be configured to operate corresponding confirmation queue or message to the user on television 504.

Figure 8:
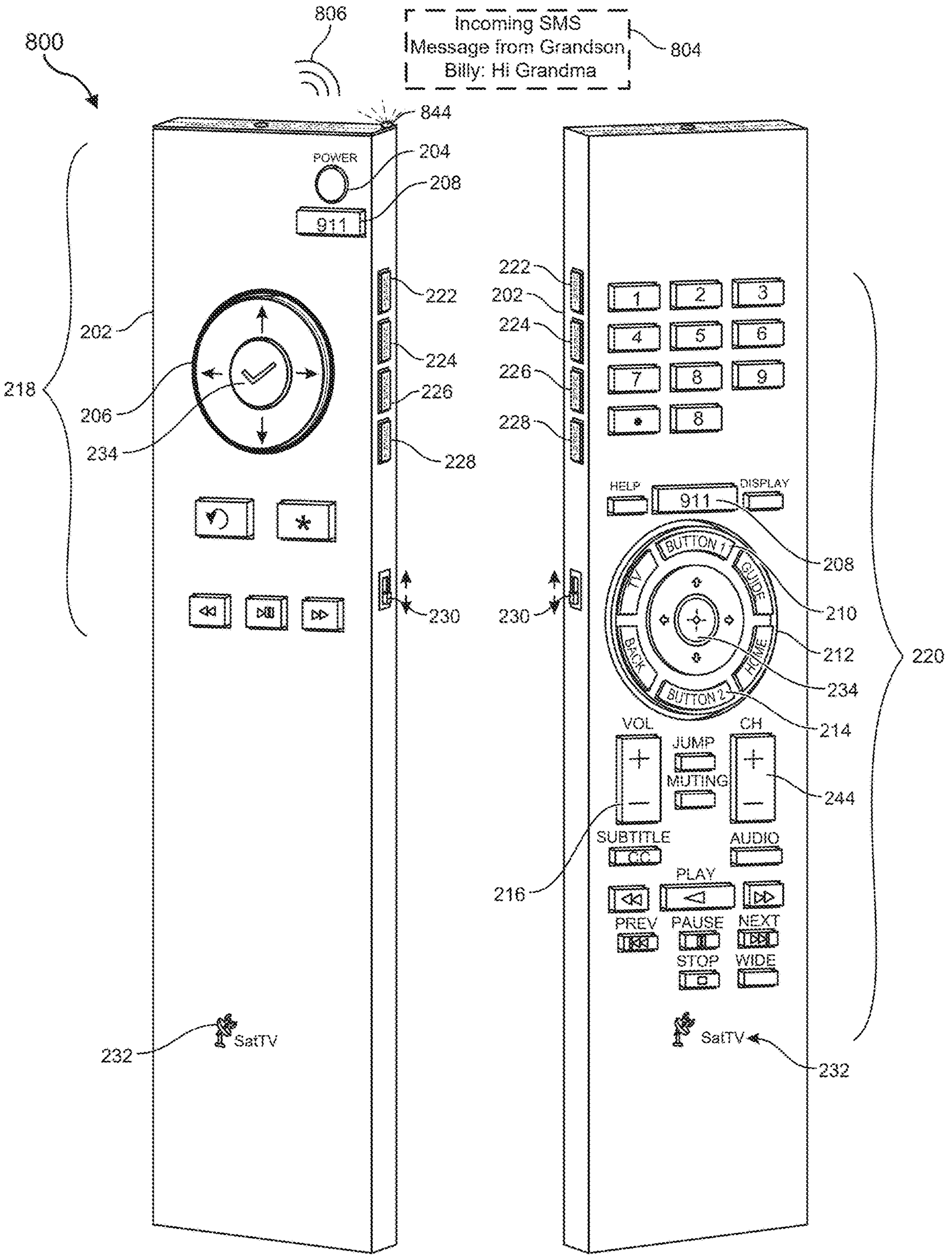
FIG. 8 shows a diagram illustrating how an example embodiment of the television remote control may issue a visual or audio alert when a connected smartphone or other device receives a message.

FIG. 8 shows a diagram 800 illustrating how an example embodiment of television remote control 202 may issue a visual or audio alert when a connected smartphone or other device receives a message. Diagram 800 may substantially repeat diagram 300, which can correspond to the example embodiment where television remote control 202 implements simpler button set 218 on one face of television remote control 202 and implements more complex button set 220 on an opposite face that is opposite of the one face, as further discussed above. Additionally, or alternatively, diagram 800 elaborates upon diagram 300 by introducing an optional LED or other light 844, which can trigger or blink to indicate the arrival of a message received from a connected device, such as a smartphone, through a local, short-range, and/or wireless connection (e.g., BlueTooth, NFC, Wi-Fi, cellular, etc.). This disclosure will later elaborate on one or more procedures for connecting such a connected device when discussing the illustrative examples of FIGS. 16-17. Diagram 800 also includes an audio indicator 806, which further indicates that the message has arrived. In some examples, the message may include a short message service message, an inter-console gaming platform message, an application message (e.g., within a social network or video game itself rather than the console), an email, a voicemail transcription, and/or any other suitable message, as understood by those having skill in the art. In various examples, the message output according to audio indicator 806 may inform the user that a message is available and/or may read the actual contents of the message. In the illustrative example of this figure, a text indicator 804 indicates the actual contents read to the user, which can include a prompt "incoming SMS message," an identifier of the sender of the message such as "Billy," and/or the actual content of the message received from the sender such as "Hi Grandma." Moreover, although diagram 800 focuses on the example of an LED light 844, in other examples any suitable visual output feature may be used, such as a seven segment display and/or a miniature display (e.g., e-ink, LCD, etc.).

Figure 9:
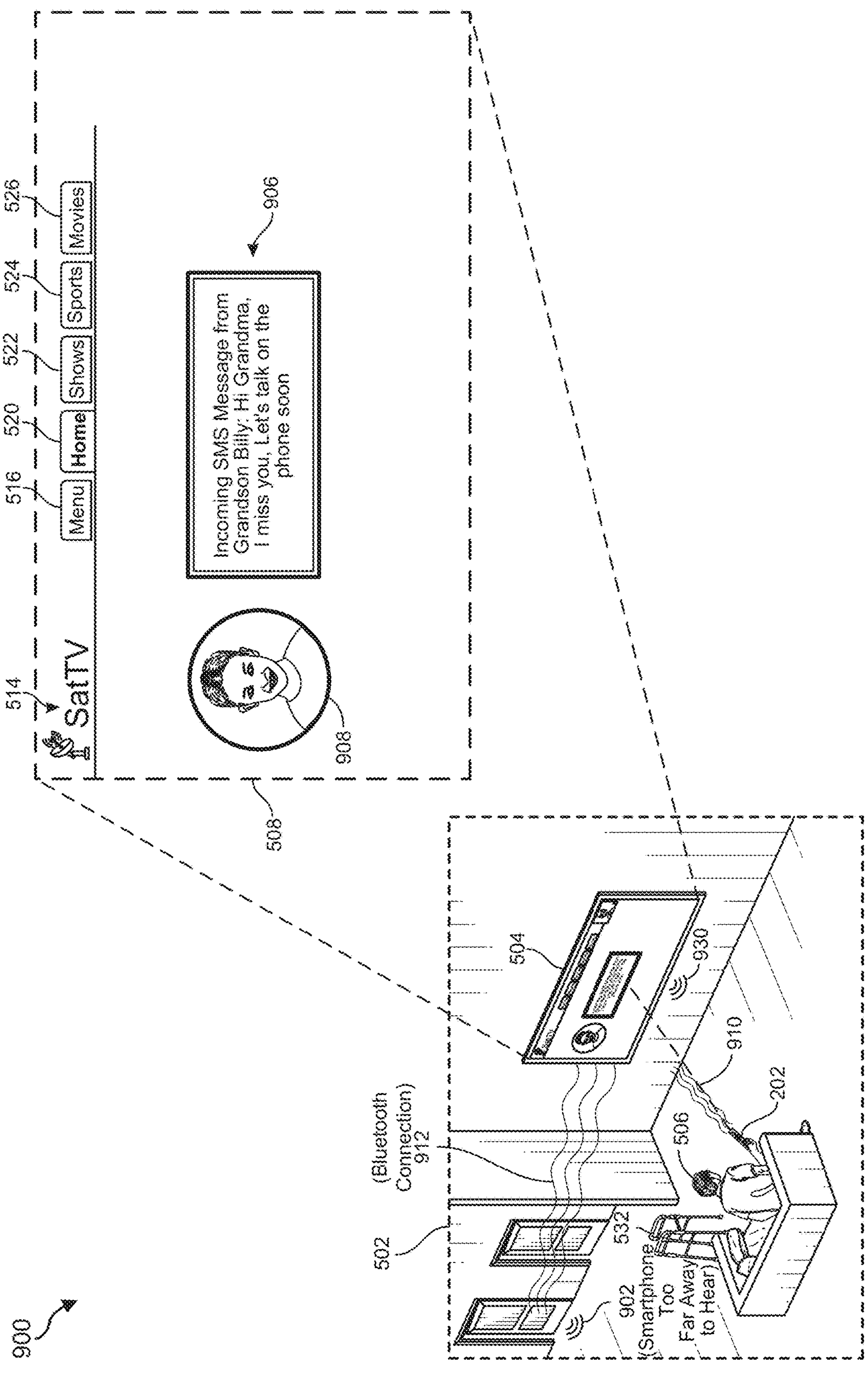
FIG. 9 shows a diagram illustrating how an example embodiment of the television remote control may trigger an audio or visual alert at a corresponding television when a connected smartphone or other device receives a message.

FIG. 9 shows a diagram 900 illustrating how an example embodiment of television remote control 202 may trigger an audio or visual alert at a corresponding television when a connected smartphone or other device receives a message. Diagram 900 substantially parallels diagram 800 in the sense that the overall system including television remote control 202 and/or television 504 reports the contents of the incoming message received at a connected device. Nevertheless, diagram 900 differs from diagram 800 in the sense that the system of diagram 900 reports the contents of the received message through sub-diagram 508 corresponding to the screen and/or speakers of television 504 rather than through a visual and/or audio output component of television remote control 202 itself.

Moreover, diagram 900 situates the above-described system within the context of the senior living facility, as further shown within sub-diagram 502 of FIG. 9. Accordingly, sub-diagram 502 further shows that a smartphone 902 of user 506 may be located behind the door of the assigned bedroom of user 506 within the senior living facility. Smartphone 902 may ring or omit an audio indicator that the message has been received, and yet this audio indicator may be too far from user 506 in the television room to actually hear. Nevertheless, sub-diagram 502 shows that smartphone 902 may have a Bluetooth connection 912 to television 504 and/or a corresponding television receiver such as a satellite service receiver (not shown in FIG. 9). An audio indicator 930 shows how television 504 may emit an audio output corresponding to the received message, in a manner that parallels the audio output of the message described above in connection with diagram 800. Optionally, television remote control 202 may also maintain a Bluetooth connection or other wireless connection 910 to the same television 504 and/or corresponding television receiver. Accordingly, in some examples, television remote control 202 and/or television 504 may output an audio and/or visual indication and/or description of the received message, as further discussed above. Similarly, sub-diagram 508 within diagram 900 includes an icon 908 corresponding to the sender of the message and/or a pop-up message 906, which includes corresponding text, as shown. In view of the above, by leveraging the wireless connection to connect smartphone 902, senior citizens can benefit from television remote control 202 and/or television 504 reporting when one or more messages are received at a connected device, such as a smartphone, even when the connected device is out of reach or in another room.

Figure 10:
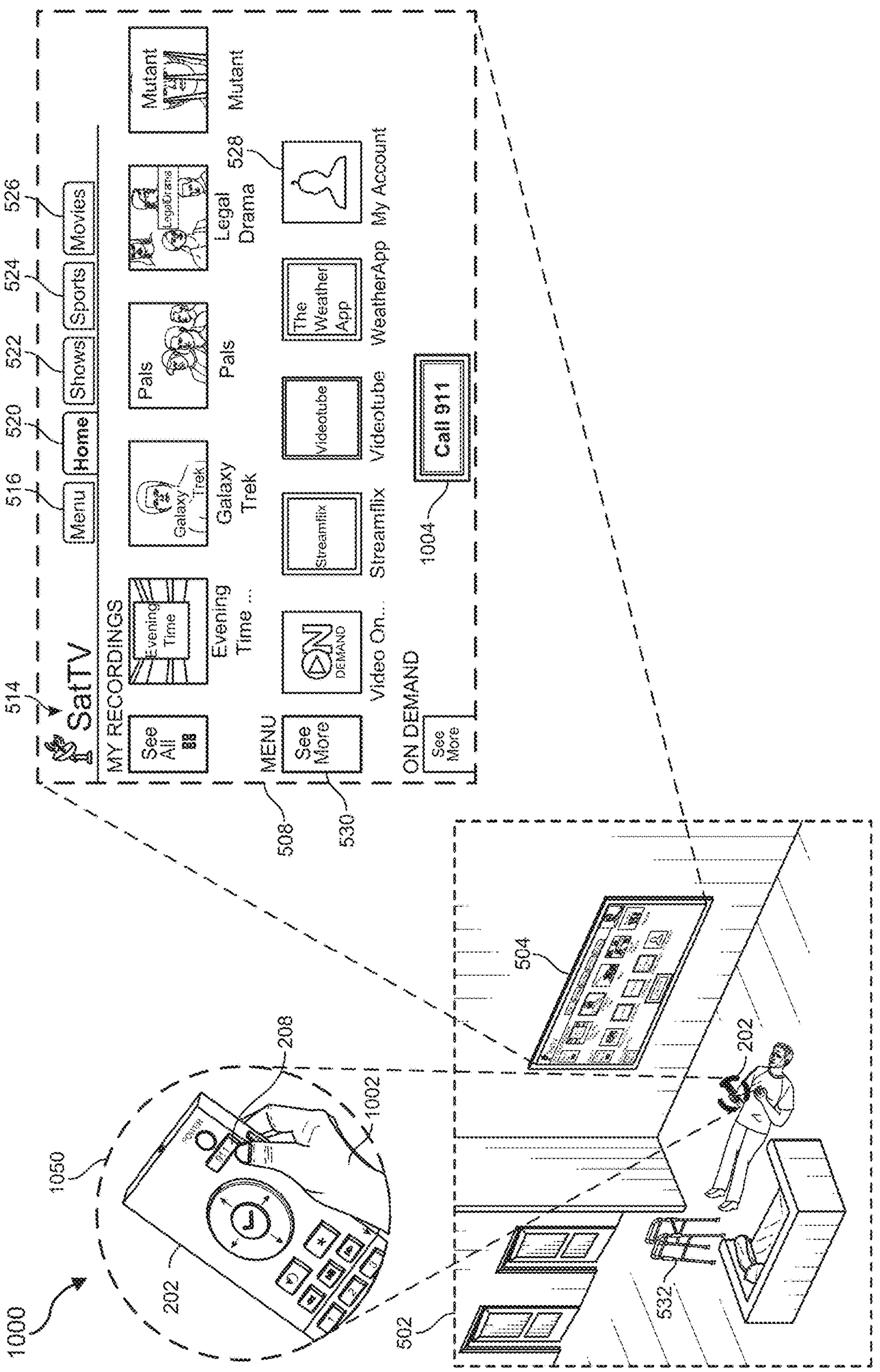
FIG. 10 shows a diagram illustrating how an example embodiment of the television remote control may include a dedicated emergency contact button that a user can press during an emergency.

FIG. 10 shows a diagram 1000 illustrating how an example embodiment of television remote control 202 may include dedicated emergency contact button 208 that a user can press during an emergency. In other words, diagram 1000 helps illustrate how, in some examples, the set of subcomponents integrated into the television remote control for controlling the television further includes a dedicated emergency contact button that is configured such that pressing the dedicated emergency contact button triggers a message from the transmitter of the television remote control commanding a receiving device to call a phone number configured as an emergency contact. Diagram 1000 shows how the user may have fallen from walker 532 and/or may have suffered from an emergency, including a medical emergency such as a heart attack. In such a scenario, a senior citizen living in a senior living facility may benefit from an embodiment of television remote control 202 that includes dedicated emergency contact button 208. Sub-diagram 1050 shows how a hand 1002 of the user may press dedicated emergency contact button 208. Diagram 1000 may parallel diagram 900 in the sense that another device, such as a smartphone, may be located out of reach or in another room while the user is suffering from the emergency. Accordingly, in such scenarios, the user can optionally use television remote control 202 as a substitute. Moreover, rather than going through a more cumbersome and complicated process of selecting a phone application on a smartphone and then typing multiple numbers to dial an emergency contact telephone number, diagram 900 shows that the user may instead effectively achieve the exact same result by pressing a single button in the form of dedicated emergency contact button 208. Accordingly, by simply pressing a single button a single time rather than executing multiple button presses and/or smartphone application navigation steps, the user may instantly dial an emergency contact number such as 911, which may immediately place the user in contact with emergency support services or professionals. In some examples, dedicated emergency contact button 208 may be configured to dial remote emergency services such as traditional 911 services. Additionally, or alternatively, in other examples, dedicated emergency contact button 208 may contact a local individual, such as an employee or professional at the senior living facility, a friend, family member, a nurse, an administrator, and/or a doctor, etc. Those having skill in the art can readily ascertain that any one or more of these individuals can assist the user with previously setting up or configuring dedicated emergency contact button 208 according to one or more preferences (see also the discussion of user profiles in connection with diagram 1100 of FIG. 11 below). For completeness, sub-diagram 508 within diagram 1000 also shows how the user may also optionally toggle an emergency contact button 1004 within the corresponding screen on television 504.

Figure 11:
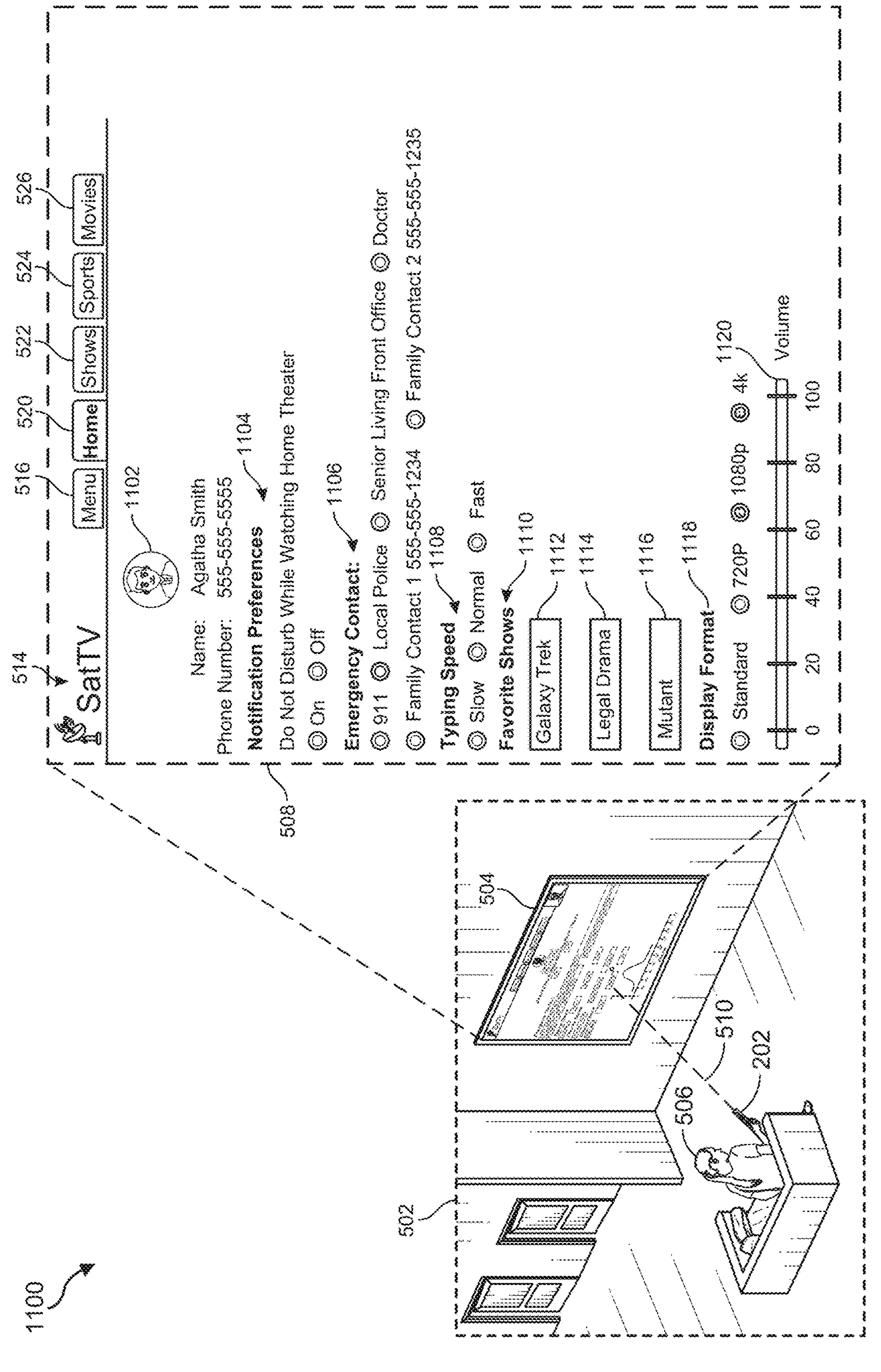
FIG. 11 shows a diagram of an example user profile that may be selected using a dedicated user profile button.

FIG. 11 shows a diagram 1100 of an example user profile that may be selected using a dedicated user profile button. In particular, diagram 1100 includes a version of sub-diagram 508 that now displays an illustrative example of a user profile. Sub-diagram 508 may include a user icon 1102 adjacent a corresponding name and telephone number, notification preferences 1104, an emergency contact field 1106, a typing speed field 1108, a favorite shows field 1110, a display format field 1118, and/or a volume preference field 1120. Notification preferences 1104 may enable the user or administrator to toggle whether or not to allow the user to be disturbed while watching a corresponding home theater system. Emergency contact field 1106 may enable the user or administrator to select one or more emergency contacts, including a primary contact, secondary contact, and/or simultaneous contacts to be contacted during an emergency, etc. Typing speed field 1108 can enable the user or administrator to select or alter an average or predicted typing speed of the user, which can include a detected typing speed of the user, as discussed in more detail below in connection with FIGS. 12-14. Favorite shows field 1110 can enable the user or administrator to verify or alter one or more indications of one or more favorite television shows or other shows that the user enjoys consuming. In the illustrative example of diagram 1100, such favorite shows for a particular user may include Galaxy Trek 1112, Legal Drama 1114, and/or Mutant 1116, as shown. Display format field 1118 may enable the user or administrator to select a preferred display format corresponding to television 504. Additionally, or alternatively, volume preference field 1120 may enable the user or administrator to modify the current volume of television 504 and/or modify general volume sensitivity and/or amplitude, as understood by those having skill in the art. The permutation of fields shown within sub-diagram 508 in diagram 1100 are merely examples for illustrative purposes. Those having skill in the art can readily ascertain that, in other examples, one or more items in this permutation of fields may be removed and/or one or more additional items may be inserted according to user preference, etc.

Figure 12:
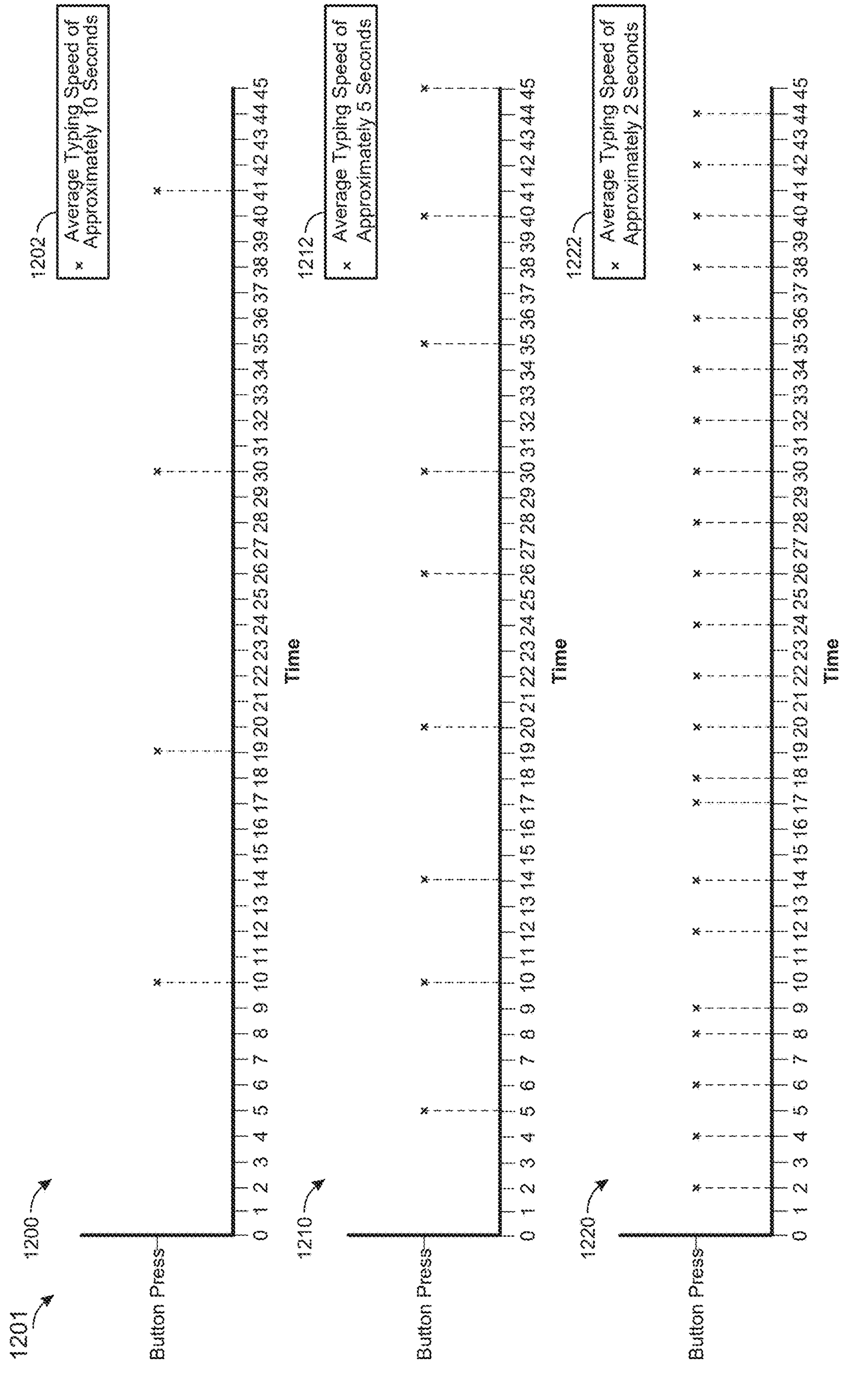
FIG. 12 shows a diagram indicating how different users of the television remote control may have different average speeds of typing or button pressing.

FIG. 12 shows a diagram 1201, including a sub-diagram 1200, a sub-diagram 1210, and a sub-diagram 1220, indicating how different users of television remote control 202 may have different average speeds of typing or button pressing. In particular, sub-diagram 1200 shows that a first user may press a button, on average, every 10 seconds, as indicated by indicator 1202. Sub-diagram 1210 shows that a second user may press a button, on average, every five seconds, as indicated by indicator 1212. Lastly, sub-diagram 1220 shows that a third user may press a button, on average, every two seconds, as indicated by indicator 1222. Accordingly, the first user of sub-diagram 1200 may have a very slow typing speed, whereas the second user of sub-diagram 1210 may have a faster but still somewhat slow typing speed, and the third user of sub-diagram 1220 may have a statistically faster typing speed.

Diagram 1200 becomes more relevant when one considers a candidate feature of television remote control 202. In this example, television remote control 202 may have the feature of enhancing convenience by eliminating the need for a user to press a confirmation or okay button in order to change the television channel. Nevertheless, when eliminating the need for the user to press the confirmation or okay button, an ambiguity arises about whether a button press for a particular number indicates the entire channel number to be switched to or, instead, merely indicates a next numeral to be appended to a multi-numeral channel that the user is attempting to type out. By way of illustrative example, when a user presses the button for the number "9," this can create an ambiguity about whether the user is attempting to switch the channel to channel 9, 91, 92, 93, 94, 95, 96, 97, 98, 99, 991, etc. Accordingly, when implementing this feature of television remote control 202, an intelligent or dynamic window of time can be applied that effectively waits or delays the finalization of the channel switch command, thereby providing sufficient time for the user to type all of the numerals that may be part of a multi-numeral channel. Returning to the illustrative example that was introduced above, after the user presses the button for "9," a window of time may be triggered during which finalization of the channel switch command is delayed and during which the user may press one or more other buttons to append additional numerals to the target channel number.

In view of the above, this disclosure envisions technologies that dynamically adjust the window of time based on a detected or specified typing speed of the user. Diagram 1200 shows how different users may have respectively different average typing speeds. This can be especially truc in the context of senior living facilities and/or in the context of any individuals having handicaps or disabilities. Accordingly, this disclosure includes embodiments that dynamically adjust the window of time based on the detected average, predicted, or corresponding typing speed of the user. In particular, those having relatively faster typing speeds may be allocated windows of time that are proportionally or correspondingly shorter, whereas those having relatively slower typing speeds may be allocated windows of time that are proportionally or correspondingly longer.

Figure 13:
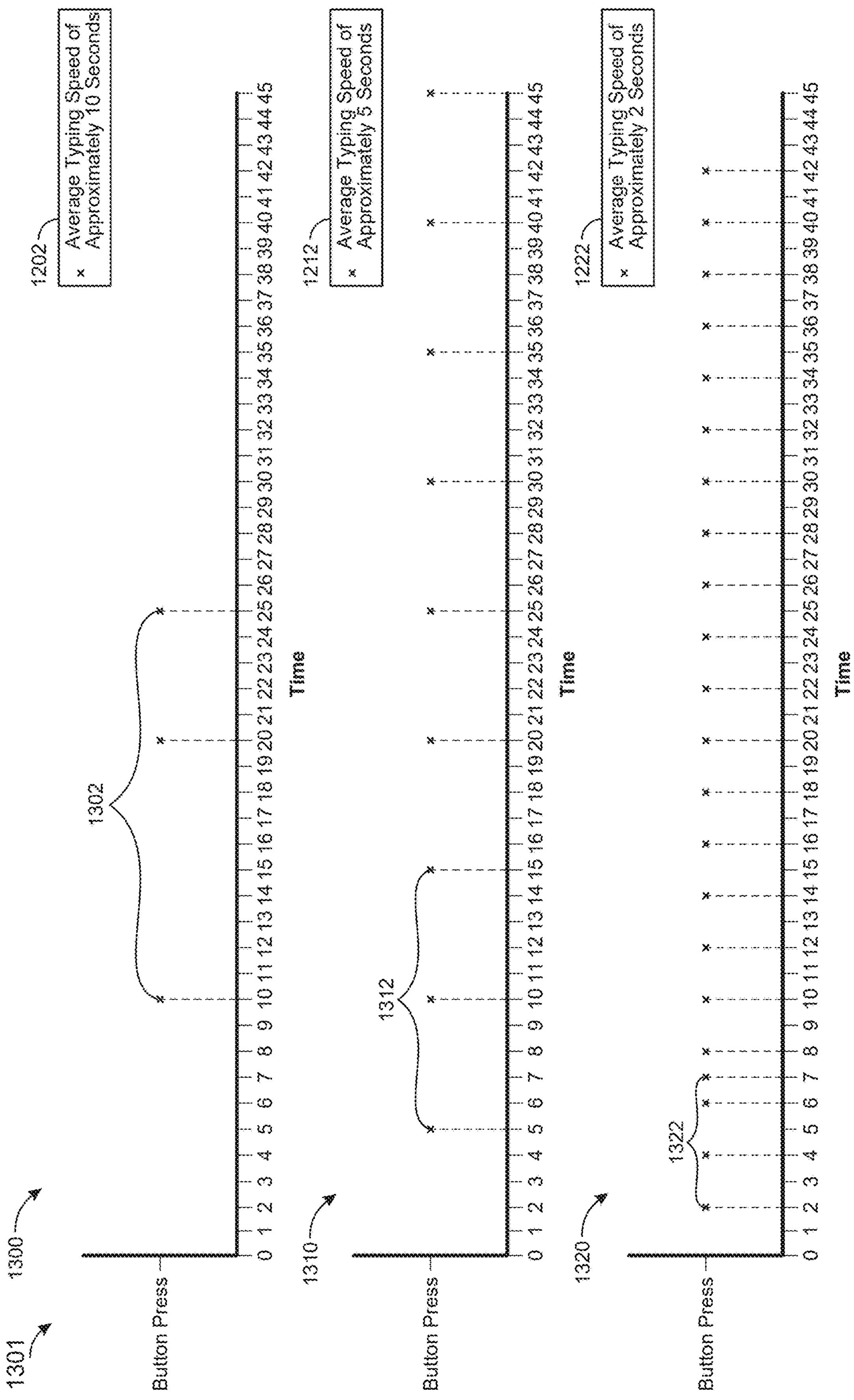
FIG. 13 shows a diagram indicating how the different users having different average speeds of typing or button pressing may therefore be dynamically allocated different windows of time in which to enter a command prior to automatically finalizing, issuing, or completing the command.

FIG. 13 shows a diagram 1301, including a sub-diagram 1300, a sub-diagram 1310, and a sub-diagram 1320, indicating how the different users having different average speeds of typing or button pressing may therefore be dynamically allocated different windows of time in which to enter a command prior to automatically finalizing, issuing, or completing the command. Diagram 1301 can generally correspond to diagram 1201, as further discussed above. Diagram 1301 claborates on diagram 1201 in the sense that diagram 1301 adds a window of time 1302, a window of time 1312, and a window of time 1322. As shown within this figure, window of time 1302 may correspond to 15 seconds, which is a relatively greater duration of the window of time to accommodate the significantly slower speed associated with the first user having average typing speed of pressing a button approximately every 10 seconds. Window of time 1310 may correspond to 10 seconds, which is a shorter or medium-level duration of the window of time to accommodate the relatively faster but still somewhat slow speed associated with the second user having the average typing speed of pressing a button approximately every five seconds. Lastly, window of time 1320 may correspond to five seconds, which is the shortest duration within diagram 1301 to accommodate the statistically faster typing speed associated with the third user having the average typing speed of pressing a button approximately every two seconds.

Figure 14:
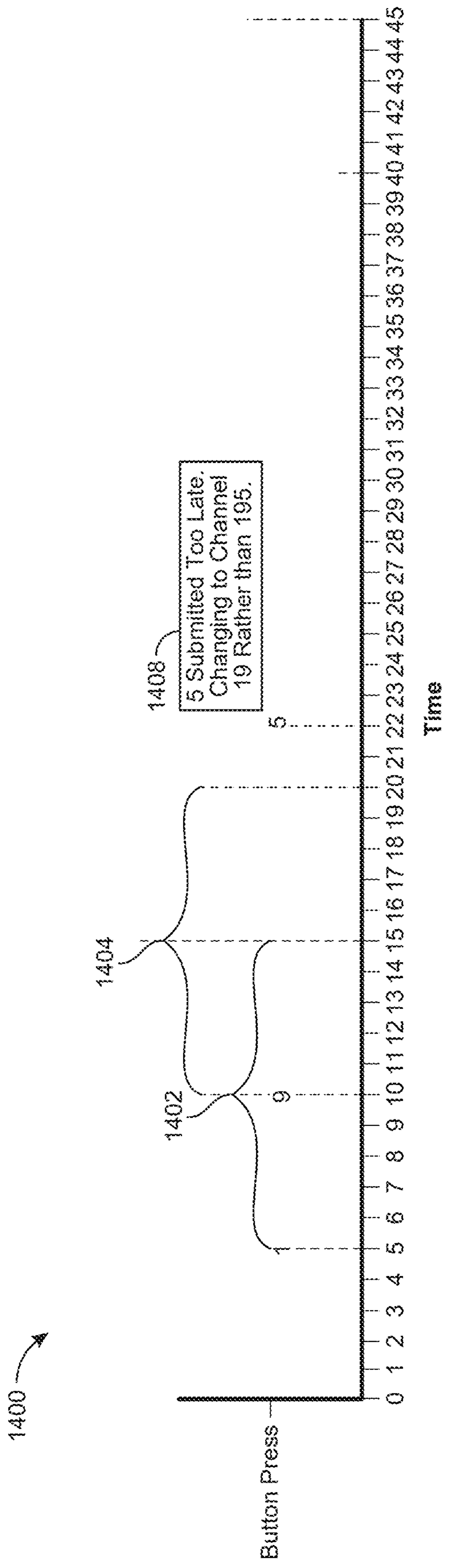
FIG. 14 shows a diagram indicating how the dynamic allocation of different windows of time may be applied in a specific example in which a user submits a button press too late outside of the allocated window of time.

FIG. 14 shows a diagram 1400 indicating how the dynamic allocation of different windows of time may be applied in a specific example in which a user submits a button press too late outside of the allocated window of time. As shown, diagram 1400 may include a window of time 1402 and a window of time 1404. Moreover, diagram 1400 further illustrates how a particular user of television remote control 202 may be attempting to switch the channel to the particular channel number of "195." Accordingly, diagram 1400 illustrates how the user presses the button for the number "1" at the five second mark, thereby triggering the start of 10 second window of time 1402, for example. Within window of time 1402, the user also successfully presses the button for the number "9" at the 10 second mark, thereby triggering the start of another 10 second window of time 1404. Nevertheless, diagram 1400 also illustrates how the user fails to enter a third numeral to complete the full channel number "195" by pressing the button for the number "5" at the 22 second mark, which is outside of the 10 second window of time 1404. Accordingly, indicator 1408 indicates to the reader that "5" was submitted too late, thereby changing to channel "19" rather than "195." As discussed above, the technology of various embodiments of this disclosure may help to address the scenario that is outlined above at least in part by detecting that the user of diagram 1400 has a slower typing speed such that the window of time, such as window of time 1402 and/or window of time 1404, should have its duration increased to accommodate the slower typing speed of the user.

Figure 15:
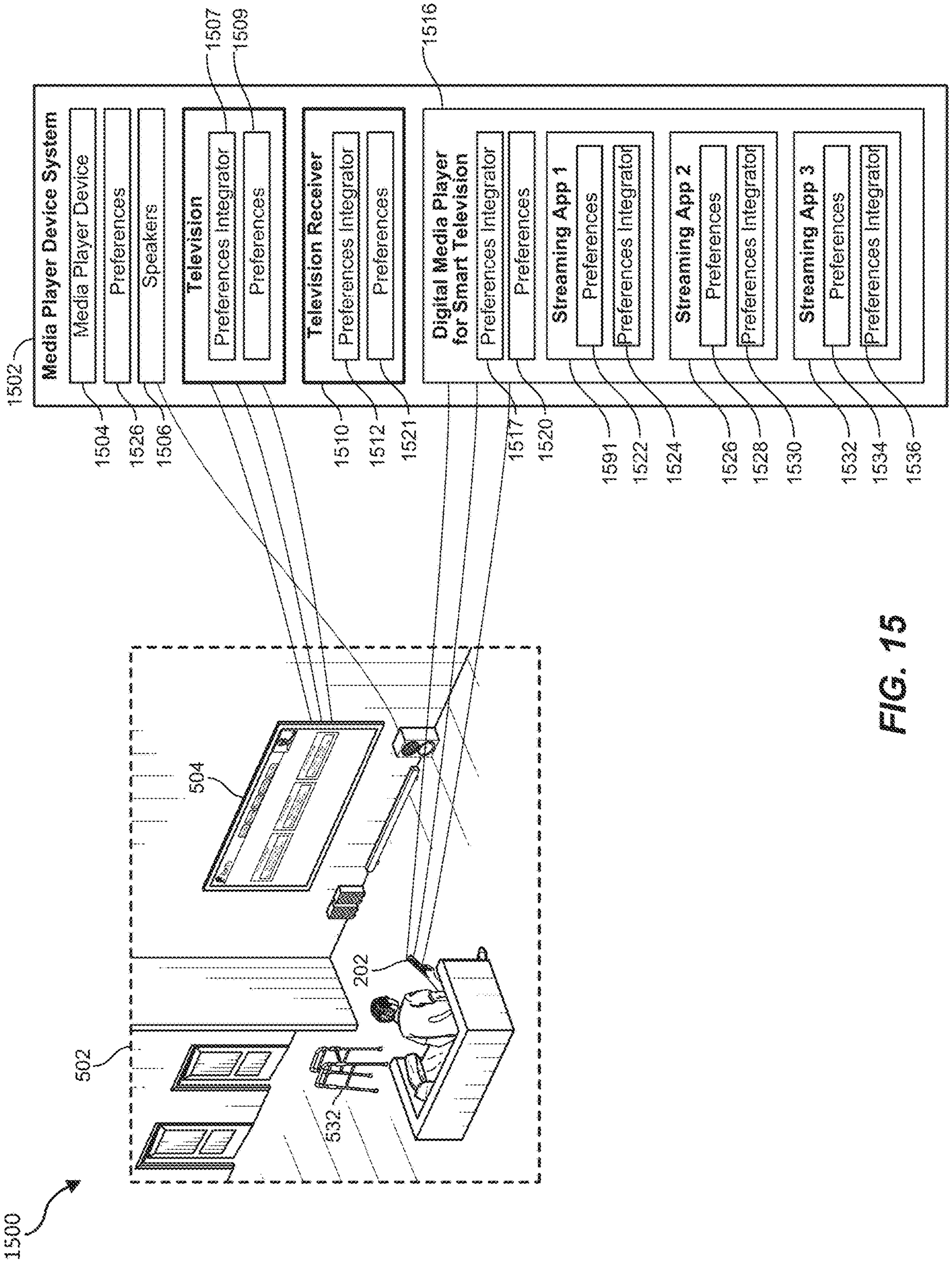
FIG. 15 shows a diagram of different subcomponents of a home theater or other entertainment system that can interface with the dedicated user profile button of the television remote control.

FIG. 15 shows a diagram 1500 of different subcomponents of a home theater or other entertainment system that can interface with the dedicated user profile button of television remote control 202. As first discussed above in connection with FIG. 2, FIG. 7, and/or FIG. 11, television remote control 202 may optionally include one or more dedicated user profile buttons. The dedicated user profile buttons may, when pressed, activate a corresponding user profile and/or corresponding preferences of a user. Nevertheless, although one or more of the examples discussed above focuses upon user preferences regarding television 504 and/or a corresponding satellite television service, the technology of this application may intelligently aggregate preferences that the user has regarding a number of components and subcomponents of the overall home theater system, as discussed further below. For example, diagram 1500 illustrates how media player device system 1502 may further include a media player device 1504, preferences 1526, speakers 1506, television 504, television receiver 1510, digital media player for smart television 1516, streaming application 1591, streaming application 1526, and/or streaming application 1532. Moreover, diagram 1500 also further indicates how media player device system 1502 may include preferences 1526, television 504 may include preferences 1509, television receiver 1510 may include preferences 1521, digital media player for smart television 1516 may include preferences 1521, streaming application 1520 may include preferences 1522, streaming application 1526 may include preferences 1528, and streaming application 1532 may include preferences 1534, for example. To help further facilitate the integration of user preferences for each one or more of these various subcomponents into a single user profile, television 504 may include preferences integrator 1507, television receiver 1510 may include preferences integrator 1512, digital media player for smart television 1516 may include preferences integrator 1517, streaming application 1520 may include preferences integrator 1524, streaming application 1526 may include preferences integrator 1530, and streaming application 1532 may include preferences integrator 1536.

The usage of one or more preferences integrators may enable the user to simultaneously activate preferences on multiple different subcomponents within media player device system 1502 without resorting to separately turning on preferences for different subcomponents manually, or in series, in a more cumbersome process. Thus, in one specific example for illustrative purposes, a particular user could press a single dedicated user profile button and thereby trigger the activation of preferences for media player device system 1502, television 504, television receiver 1510, digital media player for smart television 1516, and/or one or more streaming applications, simultaneously. Additionally, or alternatively, pressing the dedicated user profile button may trigger a signal to be sent to each corresponding subcomponent of media player devices 1502 identifying the corresponding user such that the corresponding subcomponent is informed and retains the option to activate the preferences that apply to that specific user.

In some examples, any one or more of the preferences integrators that are discussed above may be added, installed, and/or configured on the corresponding subcomponent. For example, the user and/or administrator, such as an administrator of a senior living facility, may install a corresponding preferences integrator on television 504 to help integrate the preferences that a particular user has for television 504 with television receiver 1510, which may optionally host the intelligence and/or software for the overall inventive concept of diagram 1500. Additionally, or alternatively, in some examples manufacturers of one or more subcomponents may preinstall a corresponding preferences integrator such that these components can interface with media player device system 1502 and/or the inventive concept of diagram 1500 out of the box.

Figure 16:
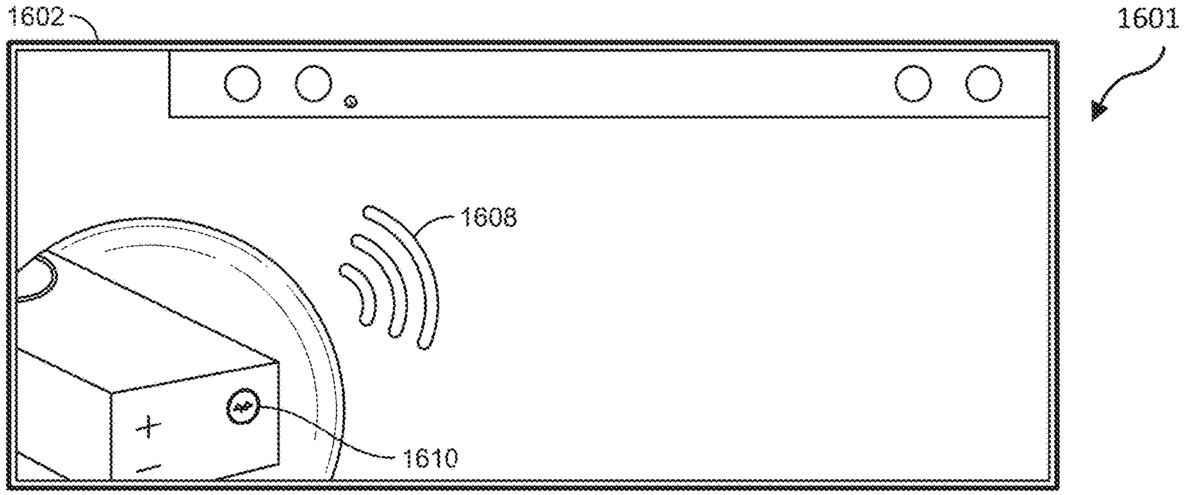
FIG. 16 shows a diagram of introductory screens associated with connecting a Bluetooth device to a television receiver, satellite receiver, or set-top box.
Figure 16:
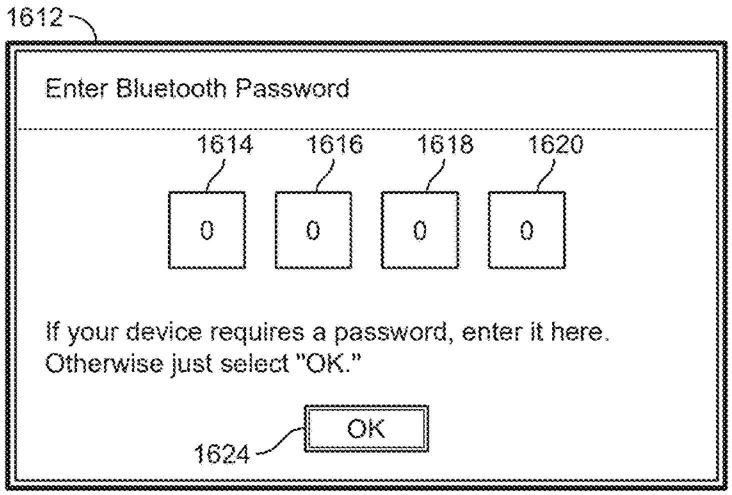
Figure 16:
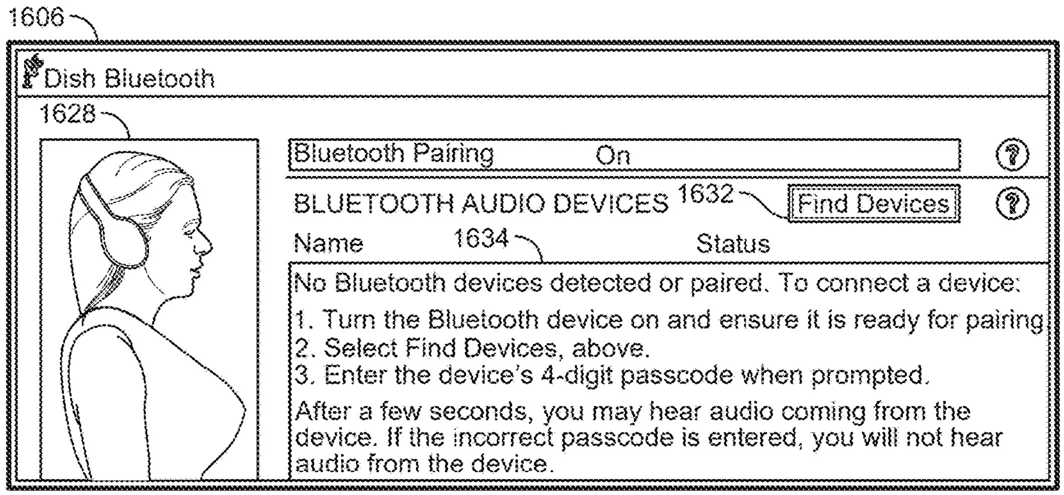

FIG. 16 shows a diagram 1601 of introductory screens, which can correspond to a sub-diagram 1602, a sub-diagram 1612, and a sub-diagram 1606, and which are associated with connecting a Bluetooth device to a television receiver, satellite receiver, or set-top box, for example. Each one of these sub-diagrams may correspond to a screen of television 504 as the television displays menus in sequence for connecting a device such as a smartphone to a corresponding television receiver or satellite television service, etc. Sub-diagram 1602 shows that the user may be prompted to press a Bluetooth toggle button 1610, which can correspond to a Bluetooth connection indicator 1608. In response, sub-diagram 1612 shows a prompt that prompts the user password. The prompt for the Bluetooth password may include a cell 1614, a cell 1616, a cell 1618, and a cell 1620, as shown. The prompt may further specify to the user that "if your device requires a password, then enter it here. Otherwise just select 'OK'." The prompt further includes an okay button 1624, as shown.

Sub-diagram 1606 further includes a user icon 1628. In the illustrative example of this figure, the user may be attempting to connect Bluetooth headphones and/or Internet connected smart headphones. Additionally, or alternatively, in other examples the user may attempt to connect a smartphone, as further discussed above. Similarly, in some examples, television remote control 202 may also have the optional feature of a Bluetooth connection with the corresponding television receiver. An indicator 1630 may specify "Bluetooth pairing" and may further specify that this particular pairing feature has been toggled "on," as shown. A button 1632 may enable the user to "find devices," thereby enabling the user to search for one or more Bluetooth-enabled devices, such as the headphones, smartphone, and/or remote control. A prompt 1634 further provides a textual indication to the user regarding which devices have been detected and/paired. If one or more devices has been detected and/or paired, then a list of such devices may be presented within the space for prompt 1634. Alternatively, in the particular example of this figure, no such devices have been detected or paired, and so prompt 1634 further specifies that "no Bluetooth device is detected or paired." Accordingly, prompt 1634 further specifies to the user that "to connect a connected device" the user may perform one or more steps. For convenient reference by the user, prompt 1634 also specifies in detail the contents of the steps. Lastly, prompt 1634 specifies to the user that "after a few seconds, you hear audio coming from the device" whereas "if the incorrect passcode is entered, you will not hear audio from the device."

Figure 17:
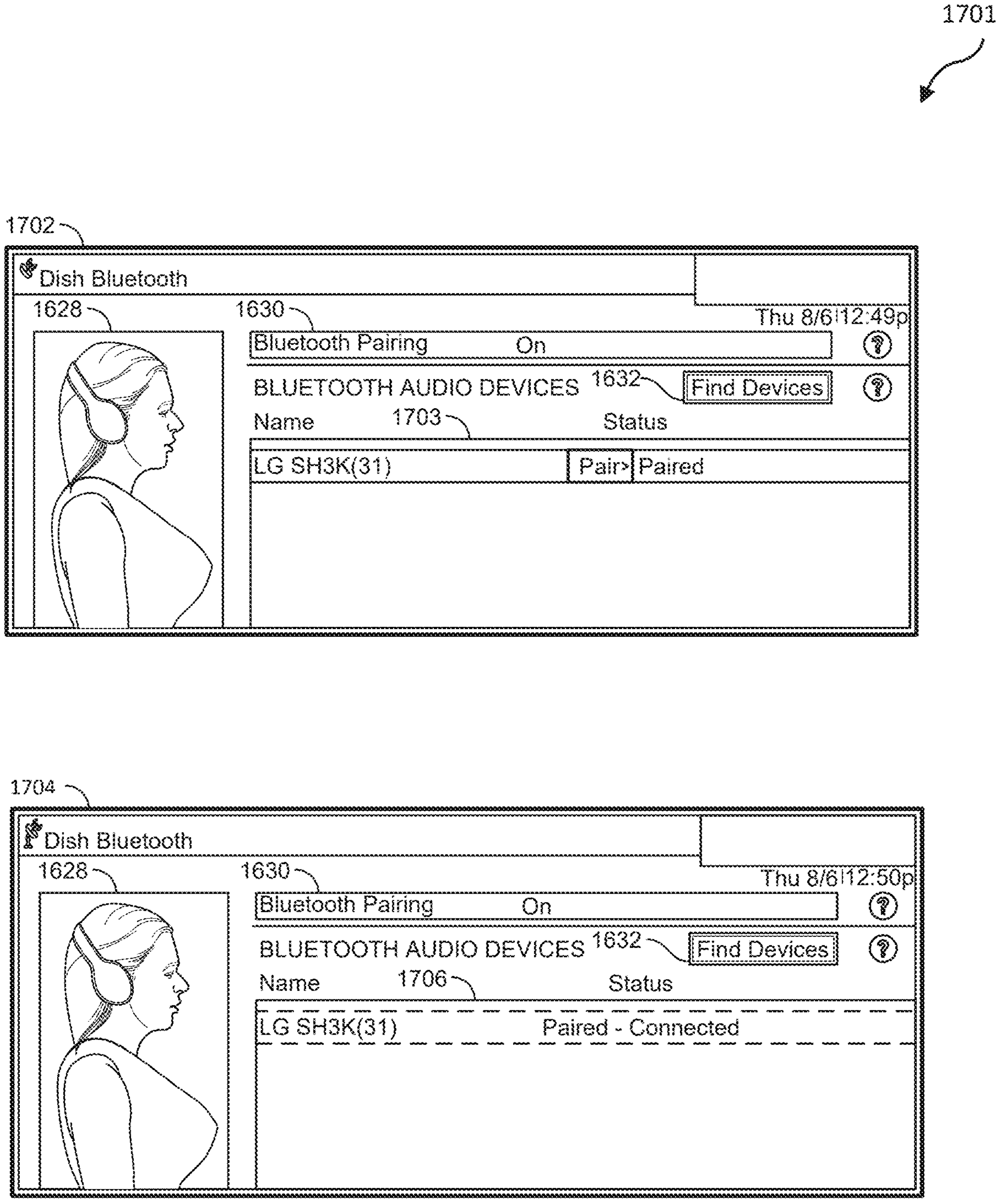
FIG. 17 shows a diagram of subsequent screens associated with connecting the Bluetooth device to the television receiver, satellite receiver, or set-top box.

FIG. 17 shows a diagram 1701, including a sub-diagram 1702 and a sub-diagram 1704, which can correspond to subsequent screens associated with connecting the Bluetooth device to the television receiver, satellite receiver, or set-top box. In particular, sub-diagram 1702 further shows that prompt 1634 has switched to a prompt 1703, which shows a list of devices that have actually been detected and/or paired. In particular, prompt 1703 lists a particular device that is named "LG SH3K(31)." Prompt 1703 also further indicates the corresponding status of this device, under a corresponding status column, as shown. In the particular example of this figure, the single device listed within prompt 1703 indicates a status of having been successfully paired. Similarly, sub-diagram 1704 substantially parallels sub-diagram 1702 except that, in sub-diagram 1704, prompt 1703 has been updated as prompt 1706, which further indicates that the corresponding device has been successfully "connected," as shown.

Figure 18:
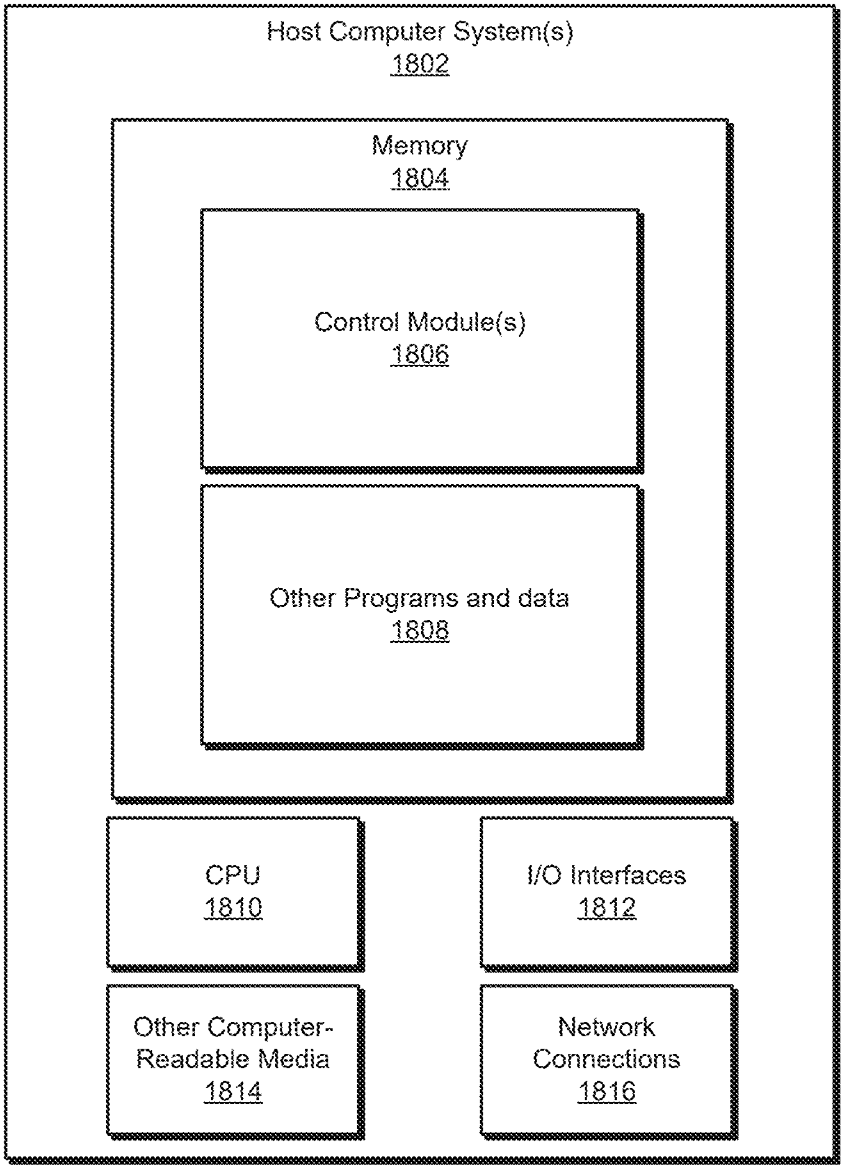
FIG. 18 shows a diagram of an example computing system that may facilitate the performance of one or more of the methods described herein.

FIG. 18 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 18 illustrates an example of underlying hardware on which such software and functionality may be hosted and/or implemented.

In particular, shown is example host computer system(s) 1802. For example, such computer system(s) 1802 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1802 may include memory 1804, one or more central processing units (CPUs) 1810, I/O interfaces 1812, other computer-readable media 1814, and network connections 1816.

Memory 1804 may include one or more various types of non-volatile and/or volatile storage technologies. Examples of memory 1804 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1804 may be utilized to store information, including computer-readable instructions that are utilized by CPU 1810 to perform actions, including those of embodiments described herein.

Memory 1804 may have stored thereon control module(s) 1806. The control module(s) 1806 may be configured to implement and/or perform some or all of the functions of the systems or components described herein. Memory 1804 may also store other programs and data 1808, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1816 are configured to communicate with other computing devices to facilitate the functionality described herein. In various embodiments, the network connections 1816 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1812 may include a video interface, other data input or output interfaces, or the like. Other computer-readable media 1814 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

integrating a set of subcomponents into a television remote control for controlling a television, the set of subcomponents comprising a first dedicated user profile button that is configured such that pressing the first dedicated user profile button triggers a first message from a transmitter of the television remote control indicating that a first specific user preference profile, from among a plurality of stored user preference profiles, is activated and enables a receiving device that receives the first message from the transmitter to adjust a display in accordance with preferences of the first specific user preference profile; and providing the television remote control to a recipient;

wherein:

the set of subcomponents integrated into the television remote control further comprises a second and distinct dedicated user profile button that is configured such that pressing the second and distinct dedicated user profile button triggers a second and distinct message from the transmitter of the television remote control indicating that a second and distinct specific user preference profile, from among the plurality of stored user preference profiles, is activated and enables the receiving device that receives the second and distinct message from the transmitter to adjust the display in accordance with preferences of the second and distinct specific user preference profile; the television remote control comprises a laser light source that emits a beam toward the display such that the receiving device magnifies an area of the display centered on a point of laser beam incidence; and the television remote control further supports hand-gesture control of volume or channel selection while the beam remains active.

2. The method of claim 1, wherein the set of subcomponents integrated into the television remote control for controlling a television further comprises a third and distinct dedicated user profile button that is configured such that pressing the third and distinct dedicated user profile button triggers a third and distinct message from the transmitter of the television remote control indicating that a third and distinct specific user preference profile, from among the plurality of stored user preference profiles, is activated and enables the receiving device that receives the third and distinct message from the transmitter to adjust the display in accordance with preferences of the third and distinct specific user preference profile.

3. The method of claim 1, wherein integrating the set of subcomponents produces the television remote control such that:

the television remote control includes a simpler button set that facilitates senior living;

the television remote control includes a more complex button set that provides a user with more complicated and more comprehensive functionality than the simpler button set; and the television remote control includes a switch that switches between enabling the simpler button set and the more complex button set.

4. The method of claim 3, wherein the switch comprises a slide that enables the user to slide the simpler button set over the more complex button set.

5. The method of claim 3, wherein the switch comprises a dedicated switch button that switches between the simpler button set and the more complex button set.

6. The method of claim 3, wherein the simpler button set includes at least one instance of a power button that toggles between on and off and the more complex button set includes an additional instance of the power button that toggles between on and off.

7. The method of claim 3, wherein the simpler button set includes the first dedicated user profile button that is configured such that pressing the first dedicated user profile button triggers the first message from the transmitter of the television remote control indicating that the first specific user preference profile, from among the plurality of stored user preference profiles, is activated and enables the receiving device that receives the first message from the transmitter to adjust the display in accordance with preferences of the first specific user preference profile.

8. The method of claim 3, wherein the simpler button set is included on one face of the television remote control and the more complex button set is included on an opposite face of the television remote control that is opposite of the one face.

9. The method of claim 3, wherein the switch is configured such that the switch disables the simpler button set when enabling the more complex button set or the switch disables the more complex button set when enabling the simpler button set.

10. A television remote control comprising:

a first dedicated user profile button that is configured such that pressing the first dedicated user profile button triggers a first message from a transmitter of the television remote control indicating that a first specific user preference profile, from among a plurality of stored user preference profiles, is activated and enables a receiving device that receives the first message from the transmitter to adjust a display in accordance with preferences of the first specific user preference profile; and a second and distinct dedicated user profile button that is configured such that pressing the second and distinct dedicated user profile button triggers a second and distinct message from the transmitter of the television remote control indicating that a second and distinct specific user preference profile, from among the plurality of stored user preference profiles, is activated and enables the receiving device that receives the second and distinct message from the transmitter to adjust the display in accordance with preferences of the second and distinct specific user preference profile;

wherein:

the television remote control comprises a laser light source that emits a beam toward the display such that the receiving device magnifies an area of the display centered on a point of laser beam incidence; and the television remote control further supports hand-gesture control of volume or channel selection while the beam remains active.

11. A method comprising:

integrating a set of subcomponents into a television remote control for controlling a television, the set of subcomponents comprising:

a first dedicated user profile button that is configured such that pressing the first dedicated user profile button triggers a first message from a transmitter of the television remote control indicating that a first specific user preference profile, from among a plurality of stored user preference profiles, is activated and enables a receiving device that receives the first message from the transmitter to adjust a display in accordance with preferences of the first specific user preference profile;

a second and distinct dedicated user profile button that is configured such that pressing the second and distinct dedicated user profile button triggers a second and distinct message from the transmitter of the television remote control indicating that a second and distinct specific user preference profile, from among the plurality of stored user preference profiles, is activated and enables the receiving device that receives the second and distinct message from the transmitter to adjust the display in accordance with preferences of the second and distinct specific user preference profile; and a dedicated emergency contact button that is configured such that pressing the dedicated emergency contact button triggers a message from the transmitter of the television remote control commanding the receiving device to call a phone number configured as an emergency contact; and providing the television remote control to a recipient;

wherein:

the television remote control comprises a laser light source that emits a beam toward the display such that the receiving device magnifies an area of the display centered on a point of laser beam incidence; and the television remote control further supports hand-gesture control of volume or channel selection while the beam remains active.

12. The method of claim 11, wherein the set of subcomponents integrated into the television remote control for controlling a television further comprises a third and distinct dedicated user profile button that is configured such that pressing the third and distinct dedicated user profile button triggers a third and distinct message from the transmitter of the television remote control indicating that a third and distinct specific user preference profile, from among the plurality of stored user preference profiles, is activated and enables the receiving device that receives the third and distinct message from the transmitter to adjust the display in accordance with preferences of the third and distinct specific user preference profile.

13. The method of claim 11, wherein integrating the set of subcomponents produces the television remote control such that:

the television remote control includes a simpler button set that facilitates senior living;

the television remote control includes a more complex button set that provides a user with more complicated and more comprehensive functionality than the simpler button set; and the television remote control includes a switch that switches between enabling the simpler button set and the more complex button set.

14. The method of claim 13, wherein the switch comprises a slide that enables the user to slide the simpler button set over the more complex button set.

15. The method of claim 13, wherein the switch comprises a dedicated switch button that switches between the simpler button set and the more complex button set.

16. The method of claim 13, wherein the simpler button set includes at least one instance of a power button that toggles between on and off and the more complex button set includes an additional instance of the power button that toggles between on and off.

17. The method of claim 13, wherein the simpler button set includes the first dedicated user profile button that is configured such that pressing the first dedicated user profile button triggers the first message from the transmitter of the television remote control indicating that the first specific user preference profile, from among the plurality of stored user preference profiles, is activated and enables the receiving device that receives the first message from the transmitter to adjust the display in accordance with preferences of the first specific user preference profile.

18. The method of claim 13, wherein the simpler button set is included on one face of the television remote control and the more complex button set is included on an opposite face of the television remote control that is opposite of the one face.

19. The method of claim 13, wherein the switch is configured such that the switch disables the simpler button set when enabling the more complex button set or the switch disables the more complex button set when enabling the simpler button set.

20. A television remote control comprising:

a first dedicated user profile button that is configured such that pressing the first dedicated user profile button triggers a first message from a transmitter of the television remote control indicating that a first specific user preference profile, from among a plurality of stored user preference profiles, is activated and enables a receiving device that receives the first message from the transmitter to adjust a display in accordance with preferences of the first specific user preference profile;

a second and distinct dedicated user profile button that is configured such that pressing the second and distinct dedicated user profile button triggers a second and distinct message from the transmitter of the television remote control indicating that a second and distinct specific user preference profile, from among the plurality of stored user preference profiles, is activated and enables the receiving device that receives the second and distinct message from the transmitter to adjust the display in accordance with preferences of the second and distinct specific user preference profile; and a dedicated emergency contact button that is configured such that pressing the dedicated emergency contact button triggers a message from the transmitter of the television remote control commanding the receiving device to call a phone number configured as an emergency contact;

wherein:

the television remote control comprises a laser light source that emits a beam toward the display such that the receiving device magnifies an area of the display centered on a point of laser beam incidence; and the television remote control further supports hand-gesture control of volume or channel selection while the beam remains active.

* * * * *